United States Patent [19]
Bonnet

[11] Patent Number: 5,489,017
[45] Date of Patent: Feb. 6, 1996

[54] TILTING TRAY PACKAGE SORTING APPARATUS

[75] Inventor: Henri Bonnet, Atlanta, Ga.

[73] Assignee: United Parcel Service of America, Inc., Atlanta, Ga.

[21] Appl. No.: 261,348

[22] Filed: Jun. 16, 1994

Related U.S. Application Data

[63] Continuation-in-part of Ser. No. 154,207, Nov. 17, 1993.

[51] Int. Cl.⁶ ................................................. B65G 47/46
[52] U.S. Cl. ...................................... 198/370.04; 105/30
[58] Field of Search ........................... 198/678.1, 687.1,
198/365; 104/118; 105/30, 141, 153

[56] References Cited

U.S. PATENT DOCUMENTS

| 3,345,471 | 10/1967 | Kilburg | 105/153 X |
|---|---|---|---|
| 3,518,947 | 7/1970 | Borst | 105/30 |
| 3,563,179 | 2/1971 | Gorjanc | 105/30 X |
| 3,757,942 | 9/1973 | Gunn. | |
| 3,955,678 | 5/1976 | Moyer. | |
| 3,977,513 | 8/1976 | Rushforth. | |
| 4,031,998 | 6/1977 | Suzuki et al.. | |
| 4,089,404 | 5/1978 | Venzke. | |
| 4,399,904 | 8/1983 | Canziani. | |
| 4,712,965 | 12/1987 | Canziani. | |
| 4,722,430 | 2/1988 | Canziani. | |
| 4,744,454 | 5/1988 | Polling. | |
| 4,838,435 | 6/1989 | Alexandre et al.. | |
| 4,846,335 | 7/1989 | Hartlepp. | |
| 4,856,642 | 8/1989 | Nicholson et al.. | |
| 4,982,828 | 1/1991 | Nicolson et al.. | |
| 5,018,928 | 5/1991 | Hartlepp. | |
| 5,054,601 | 10/1991 | Sjogren et al.. | |
| 5,069,141 | 12/1991 | Ohara et al. | 105/30 |
| 5,086,905 | 2/1992 | Polling. | |
| 5,090,552 | 2/1992 | Fukuyama et al.. | |
| 5,181,597 | 1/1993 | Geerts. | |
| 5,307,921 | 5/1994 | Richardson. | |

FOREIGN PATENT DOCUMENTS

| 0753876 | 3/1967 | Canada | 105/30 |
|---|---|---|---|
| 0553764 | 8/1993 | European Pat. Off. | 105/30 |
| 0533601 | 9/1931 | Germany | 105/30 |
| 2460296 | 7/1975 | Germany. | |
| 8714976 | 2/1988 | Germany. | |
| 4104341 | 9/1991 | Germany. | |
| 0138010 | 5/1990 | Japan. | |
| 0152664 | 12/1966 | U.S.S.R. | 105/30 |
| 2002314 | 2/1979 | United Kingdom. | |
| 2073691 | 10/1981 | United Kingdom. | |
| 2184416 | 6/1987 | United Kingdom. | |
| 2197633 | 5/1988 | United Kingdom. | |

Primary Examiner—James R. Bidwell
Attorney, Agent, or Firm—Jones & Askew

[57] ABSTRACT

An automatic system for sorting items, such as small parcels, into groups bound for different geographical locations is described. The system includes a carriage for traveling along a track, the carriage having an adjustment feature such that it may continuously be held against the track. The carriage also provides a tilt tray in which packages are presented on a convex surface. The convex surface causes the package to be destabilized, so they may be quickly discharged from the tilt tray.

20 Claims, 16 Drawing Sheets

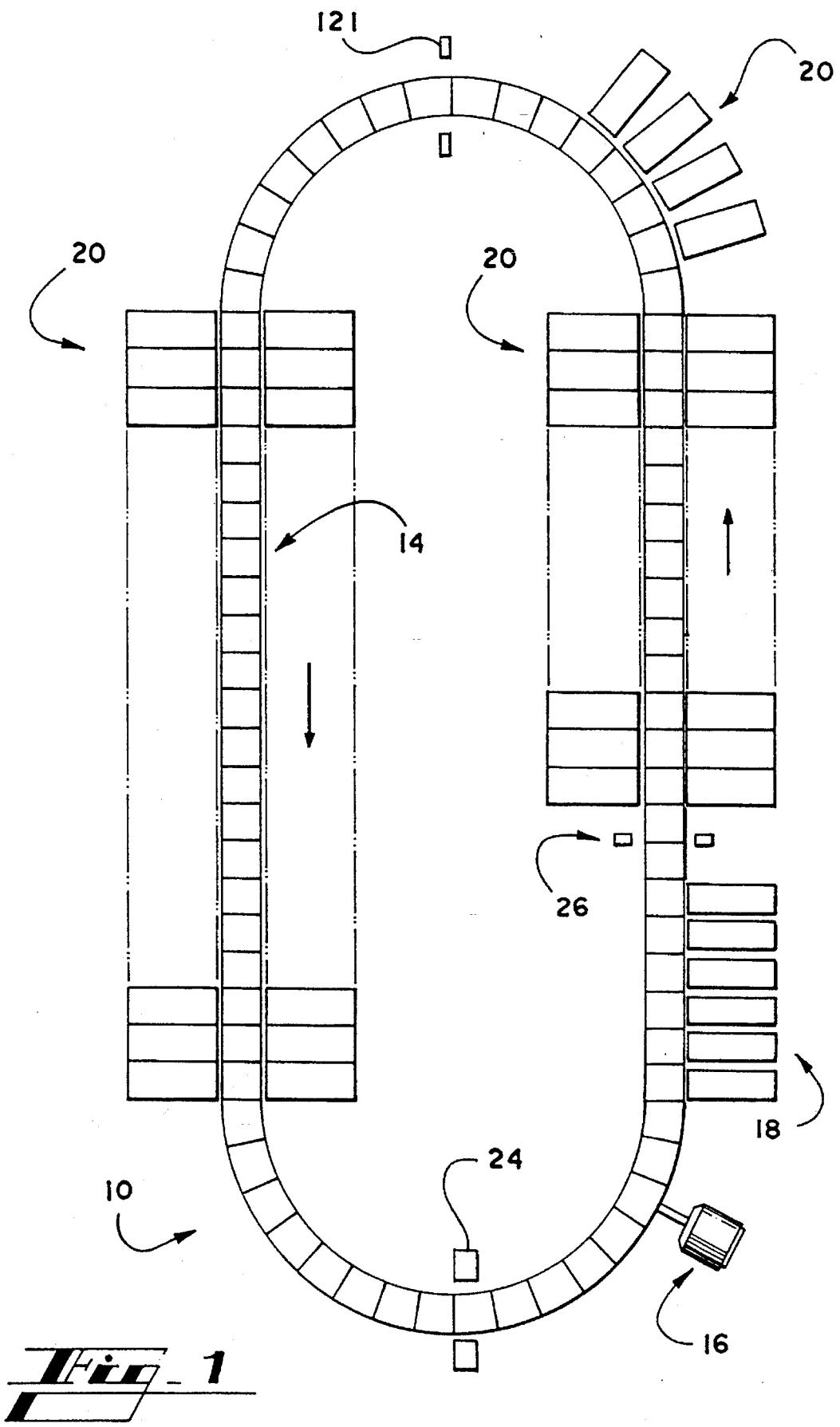

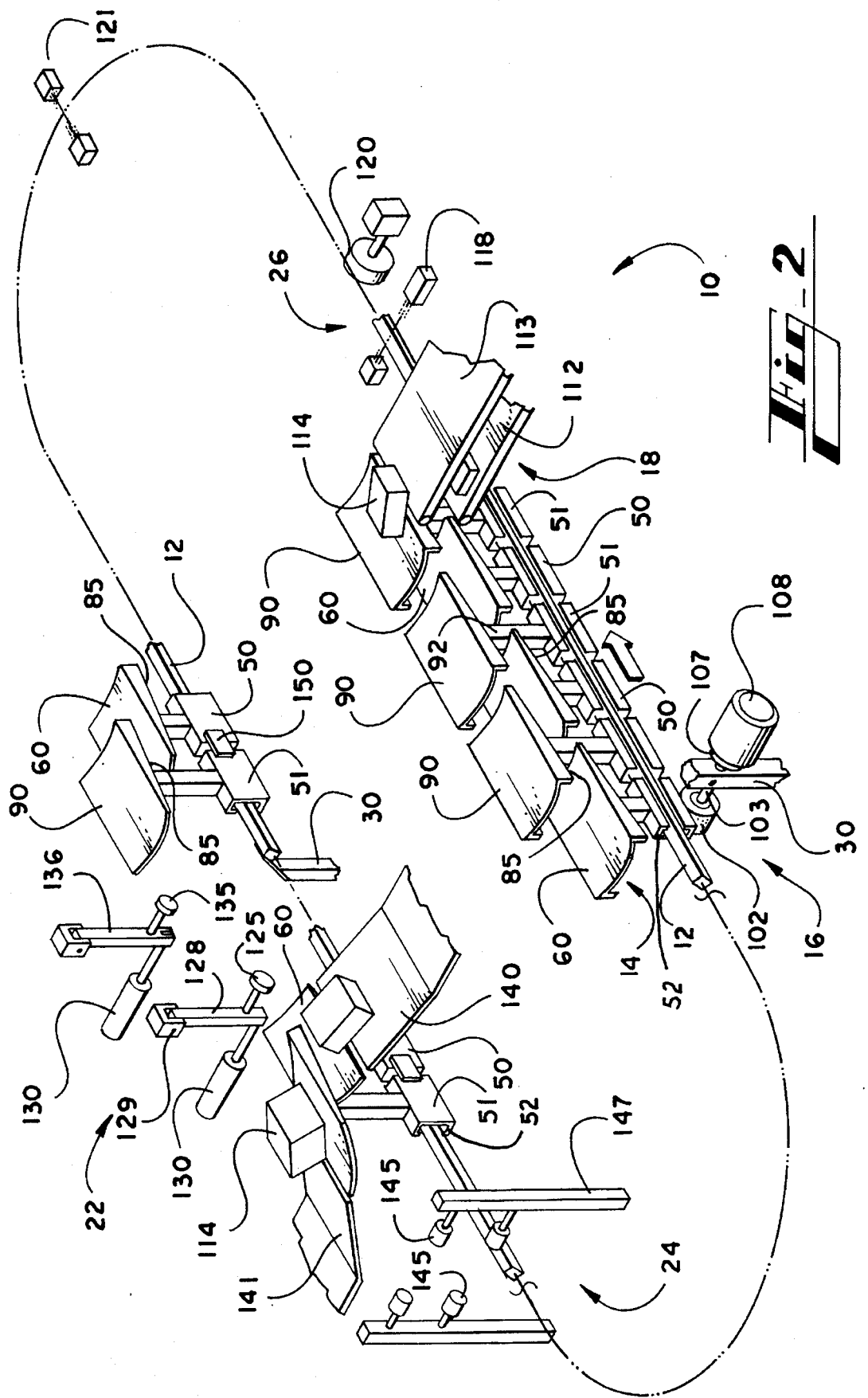

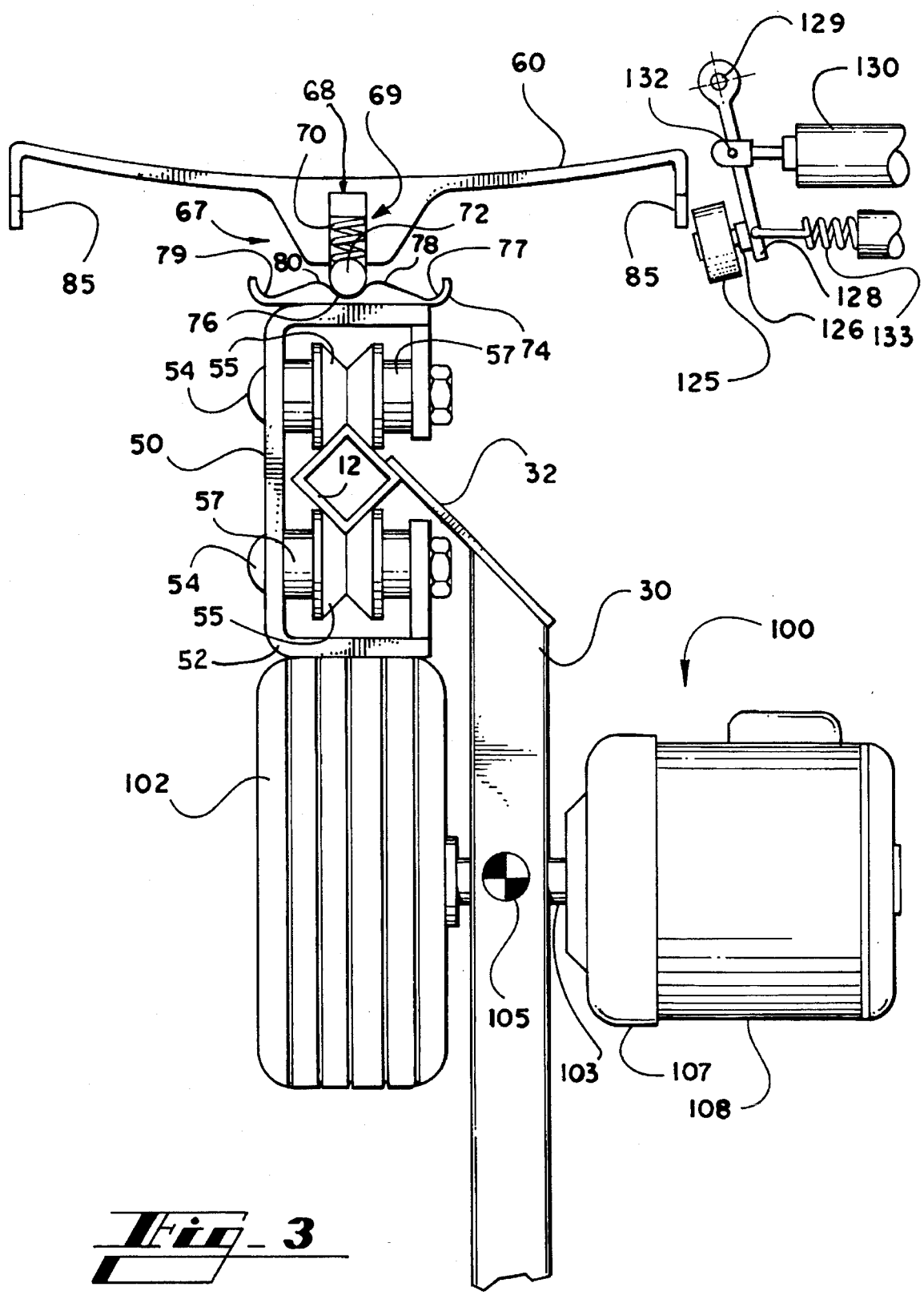
Fig_3

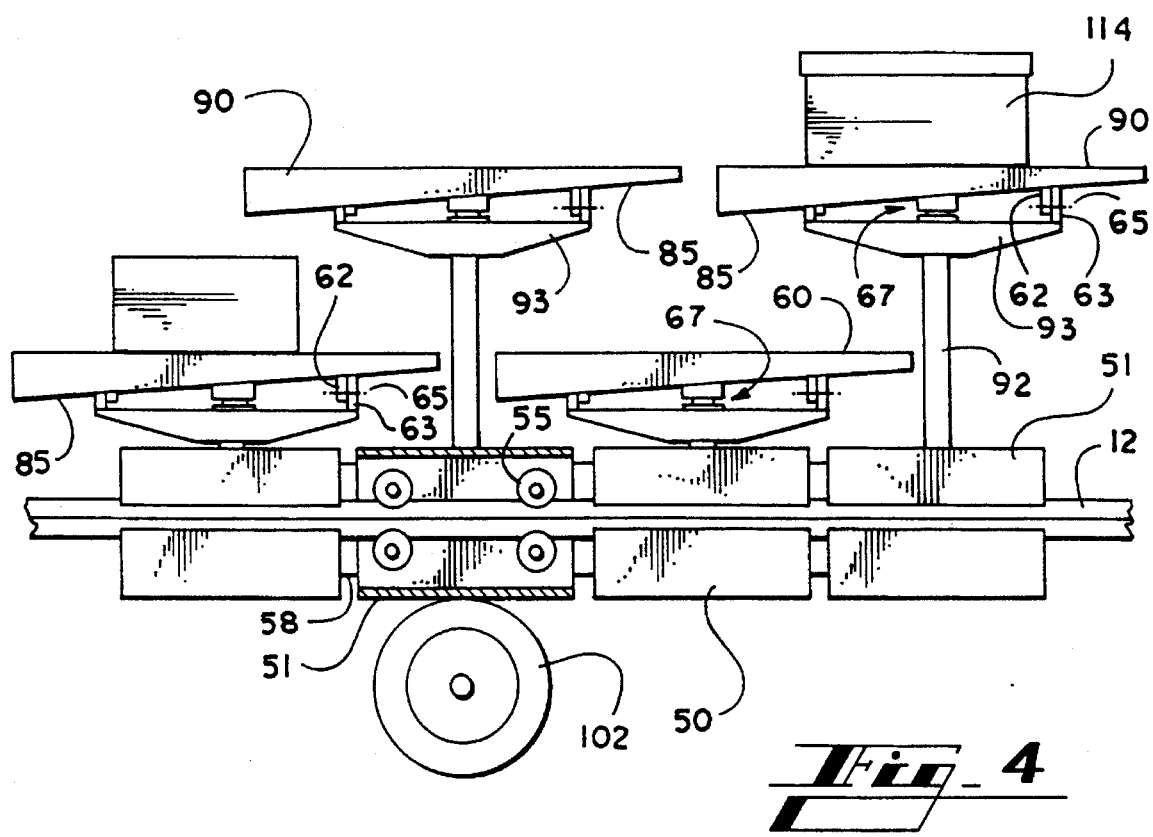
Fig_4
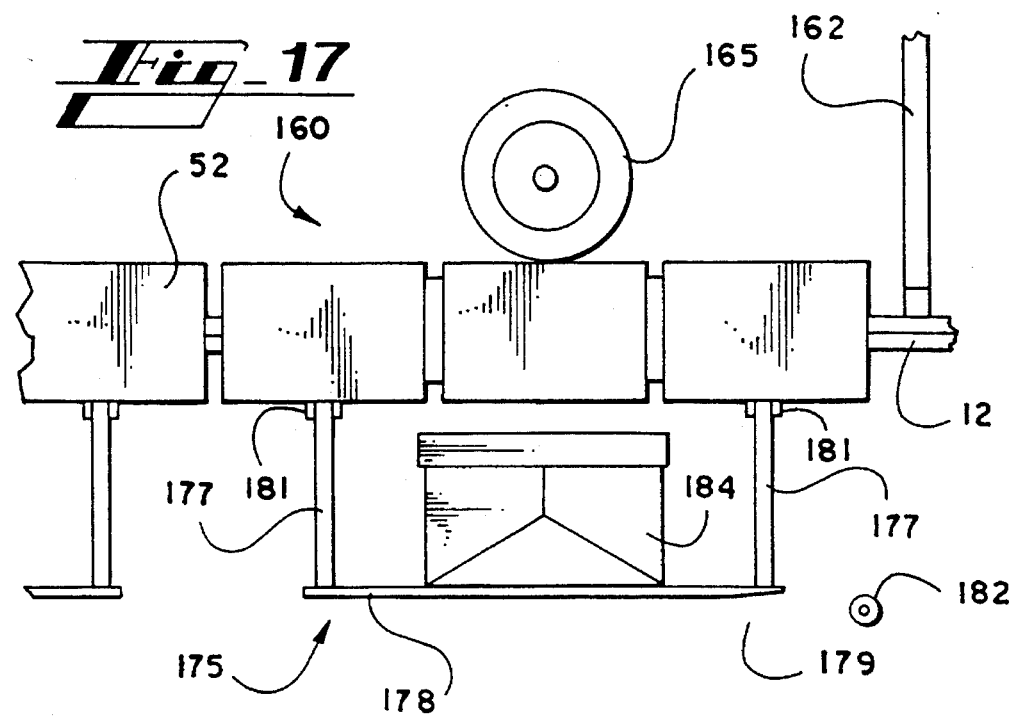
Fig_17

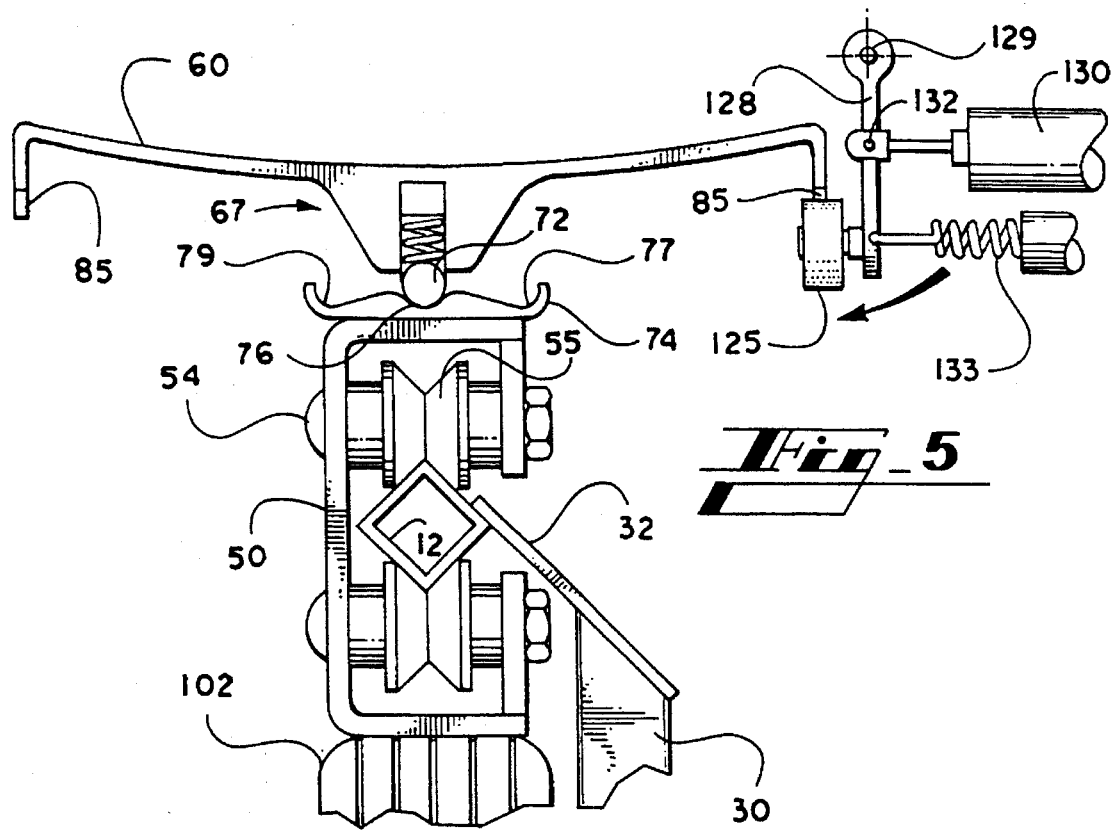
Fig_5
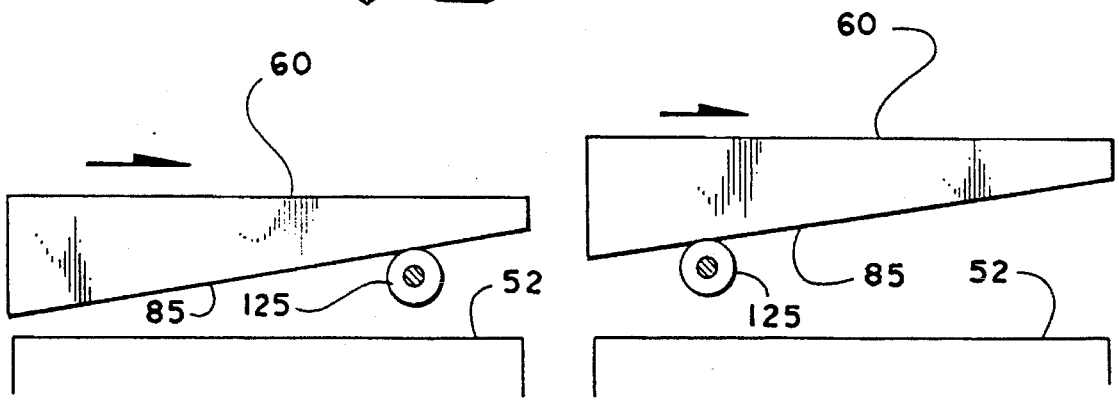
Fig_6
Fig_7
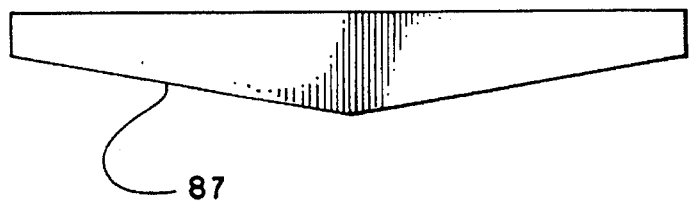
Fig_8

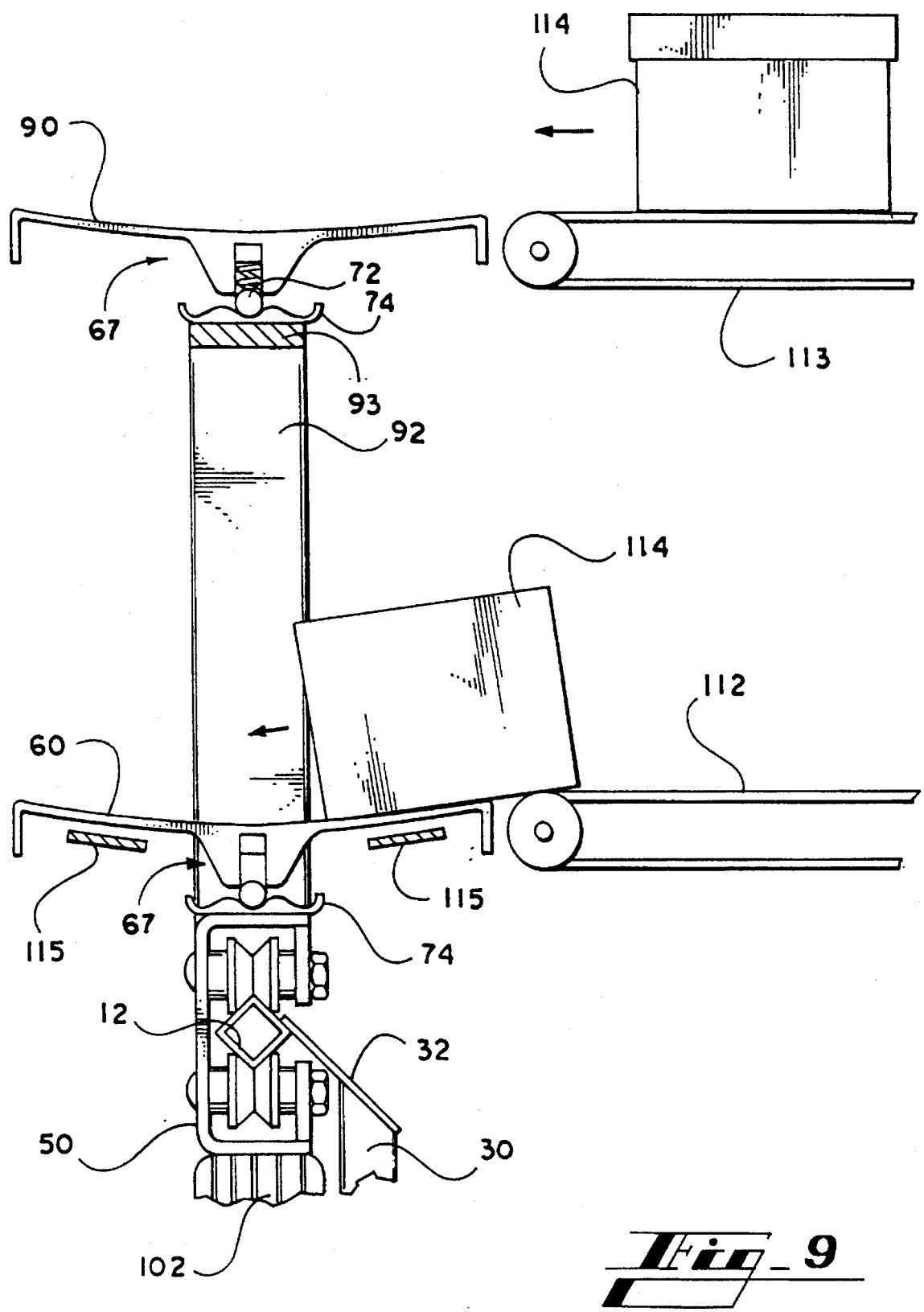
Fig_9

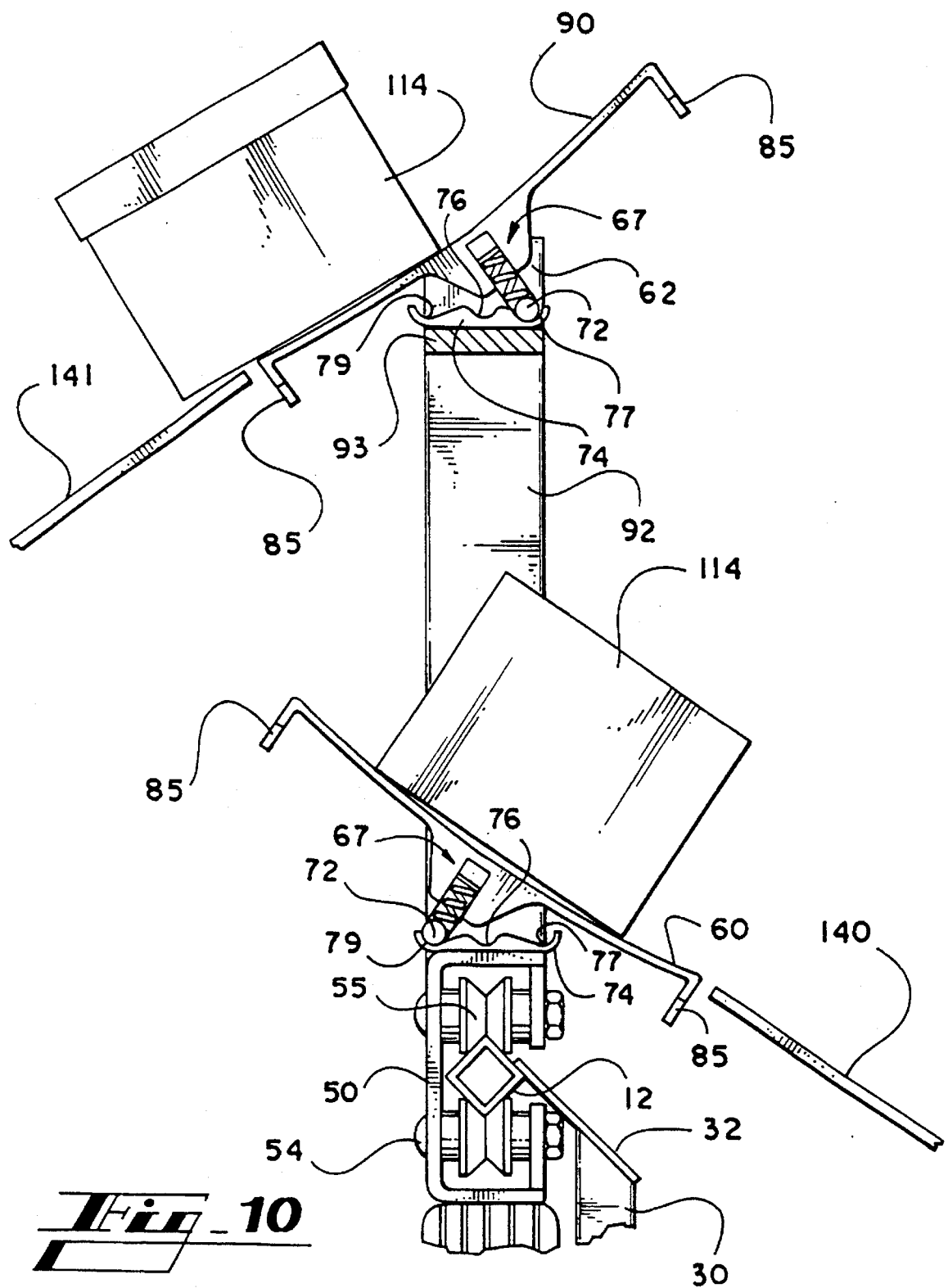

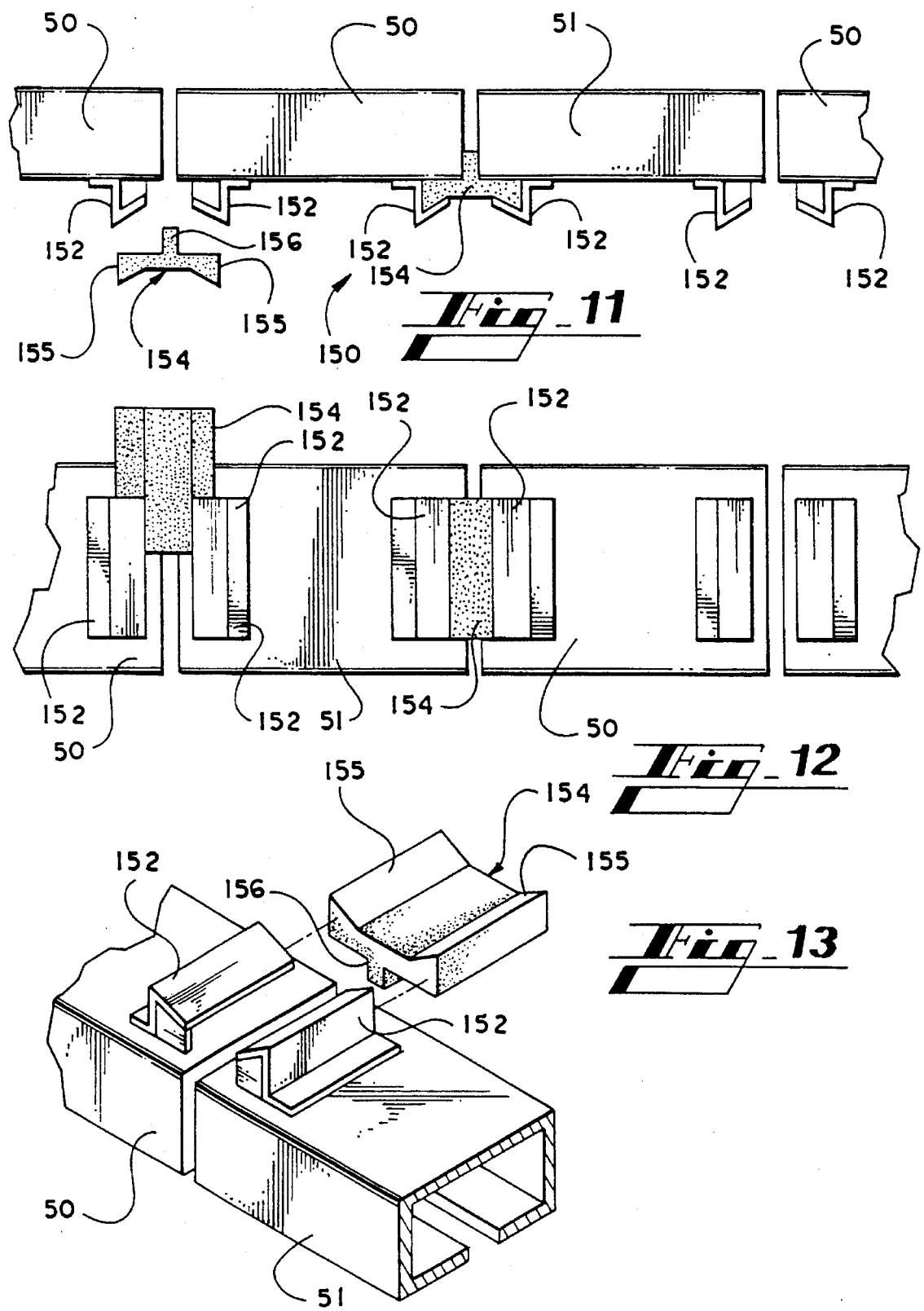

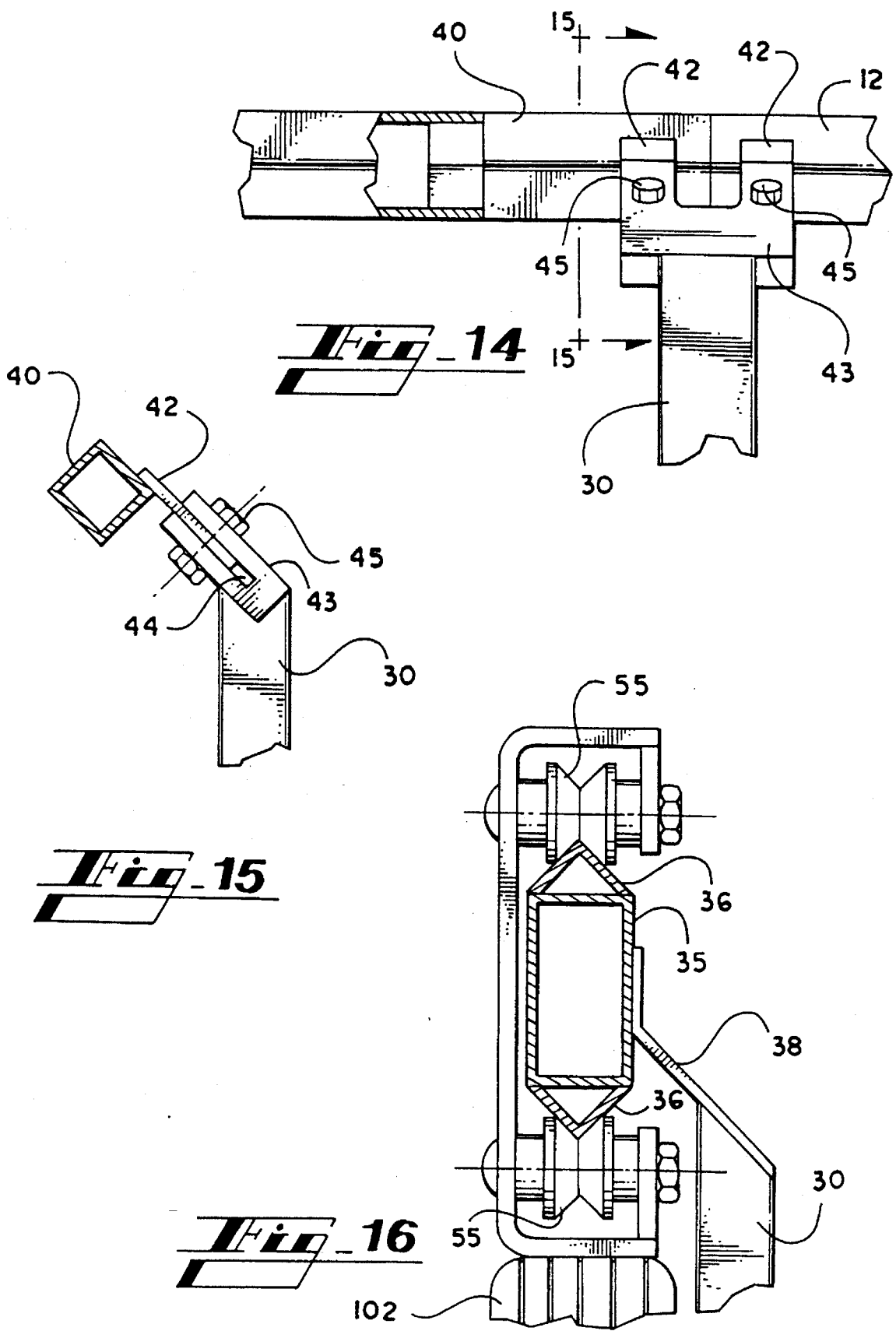

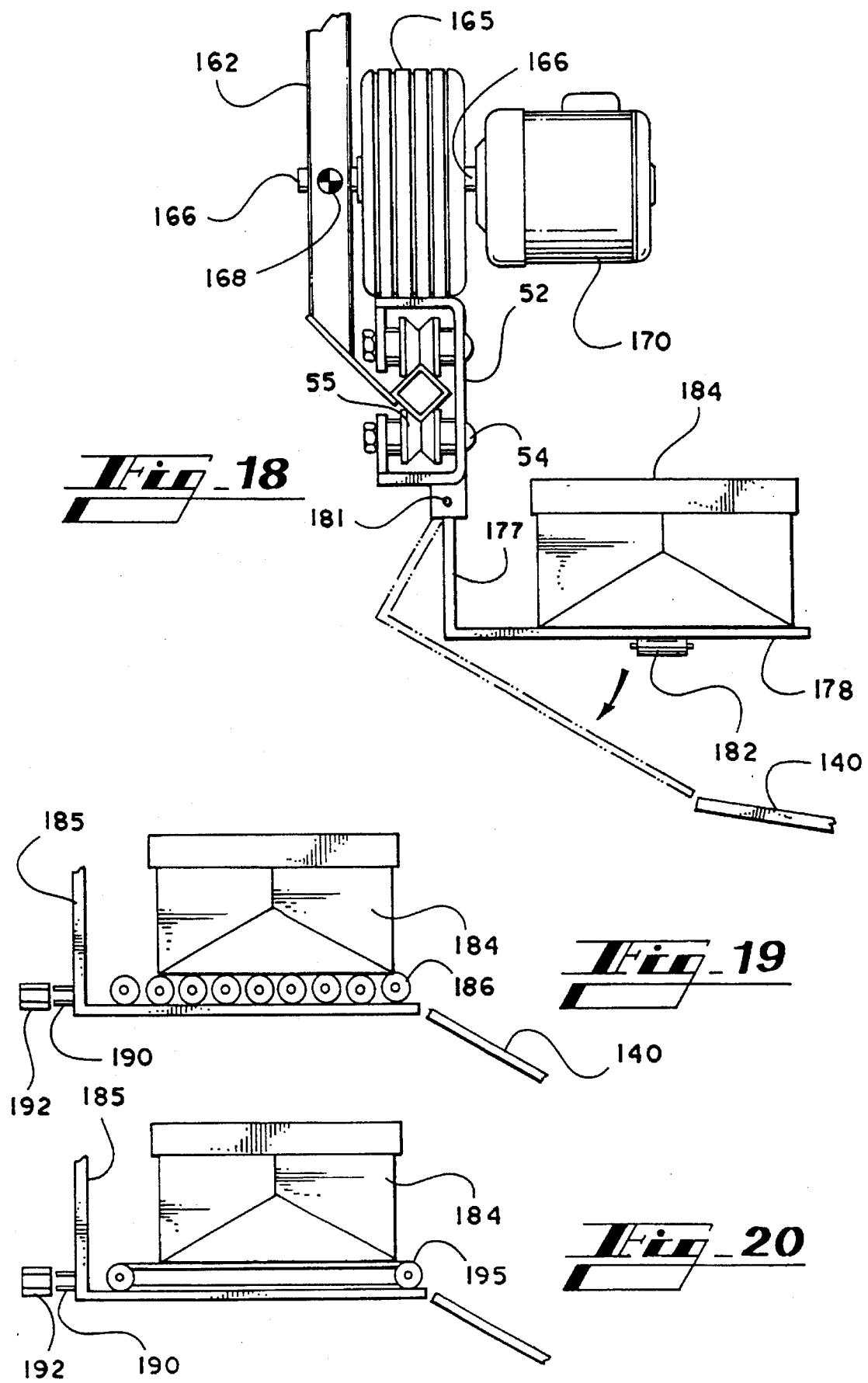

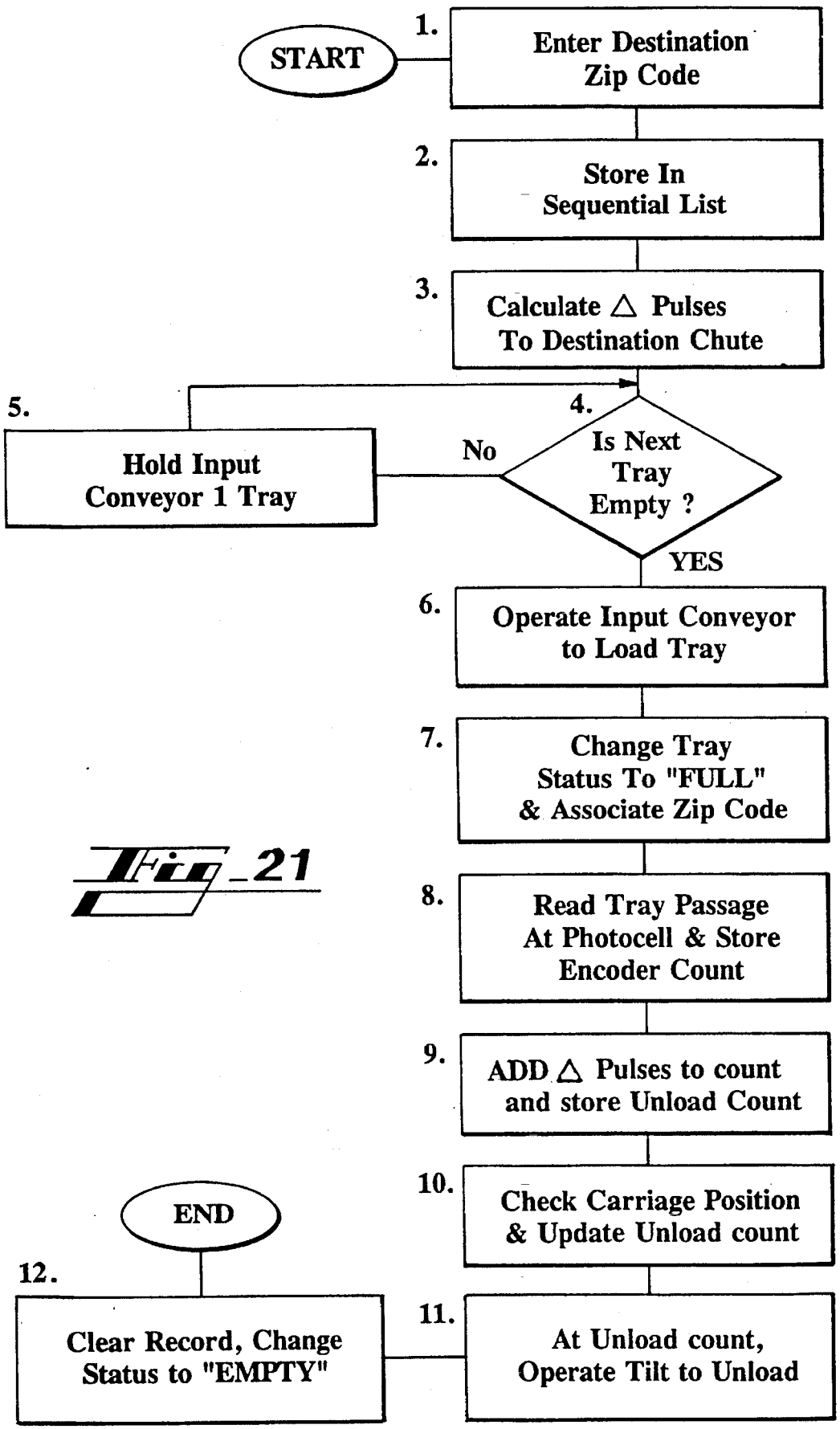
Fig_21

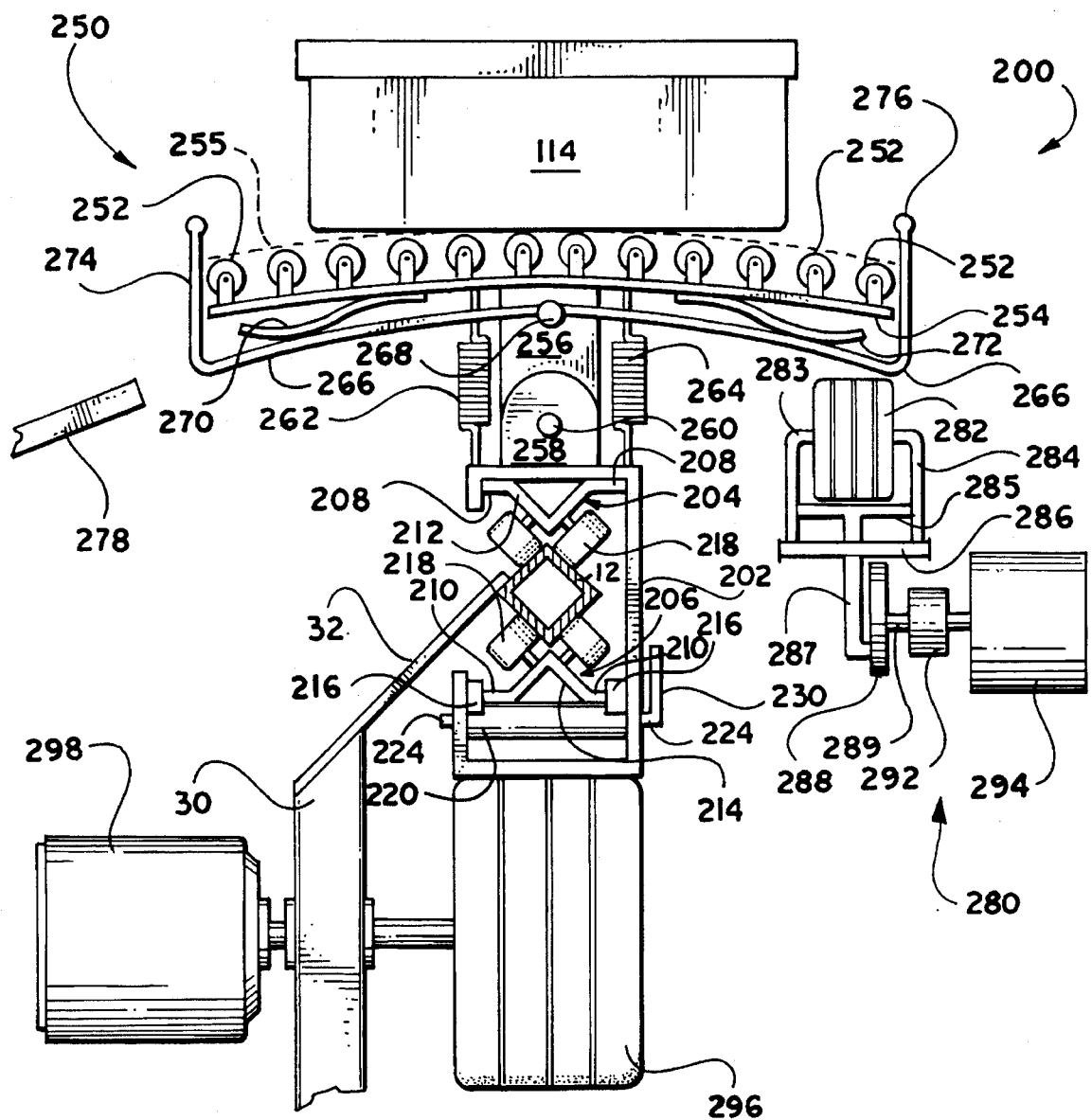
Fig_22

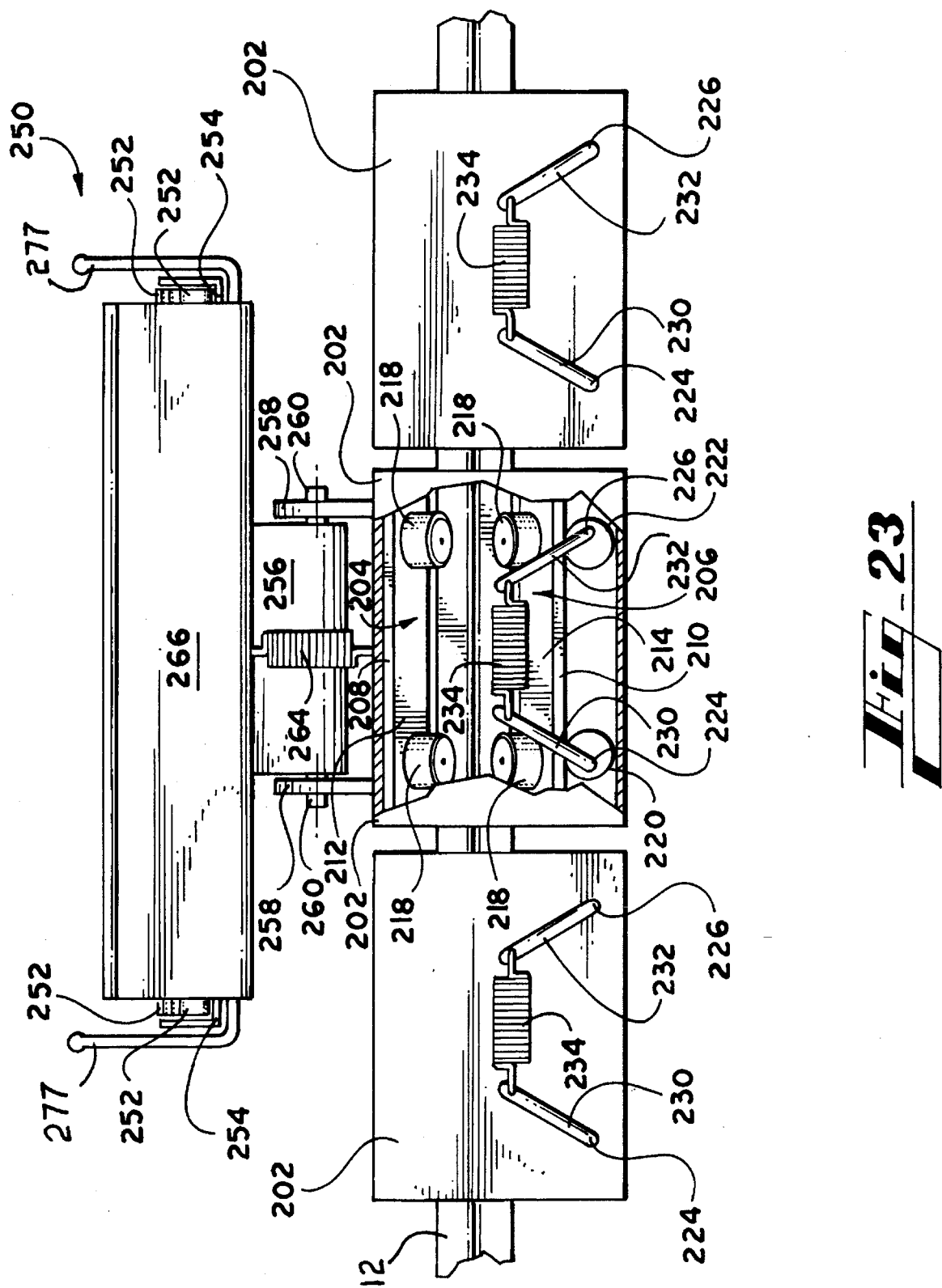

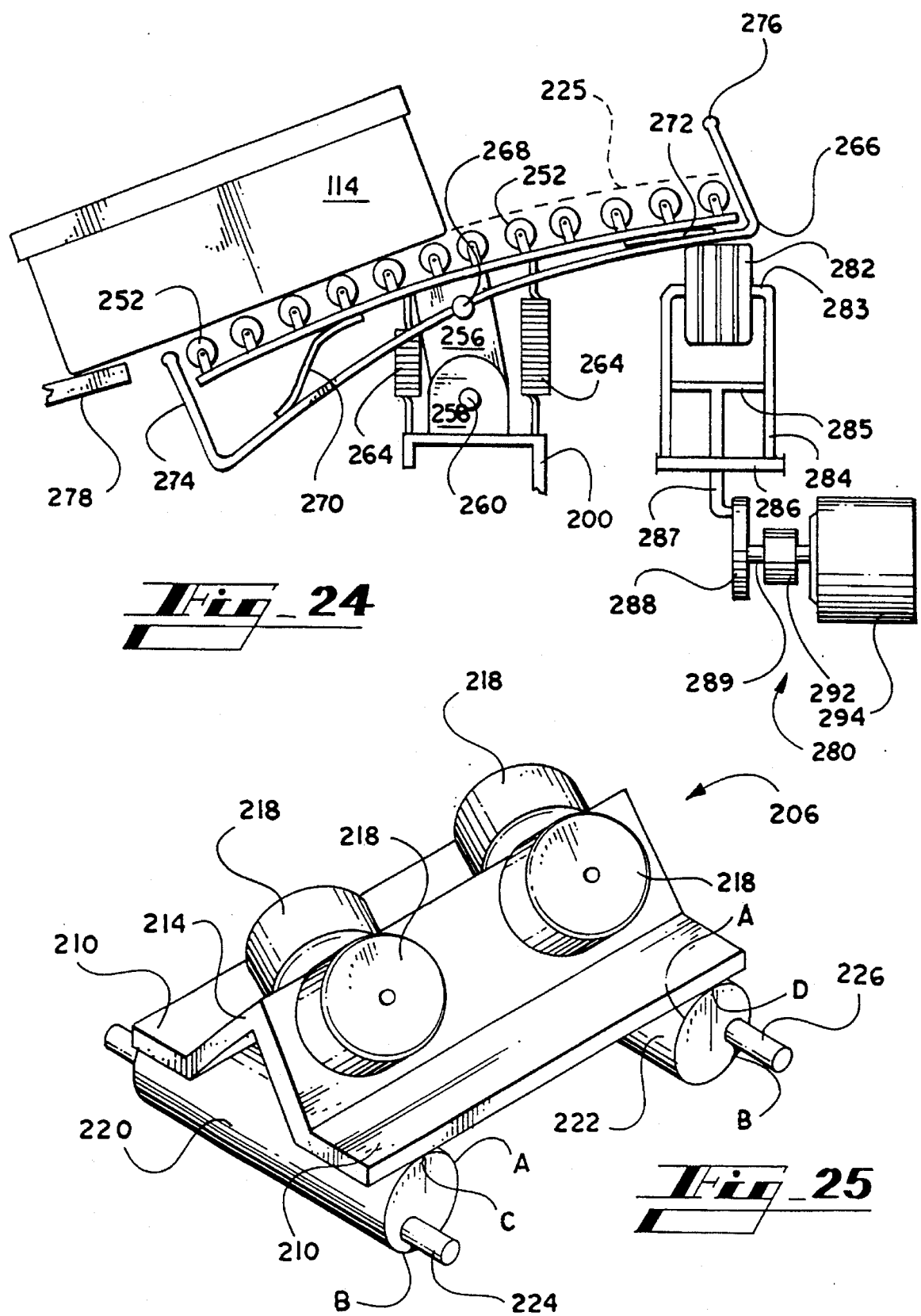

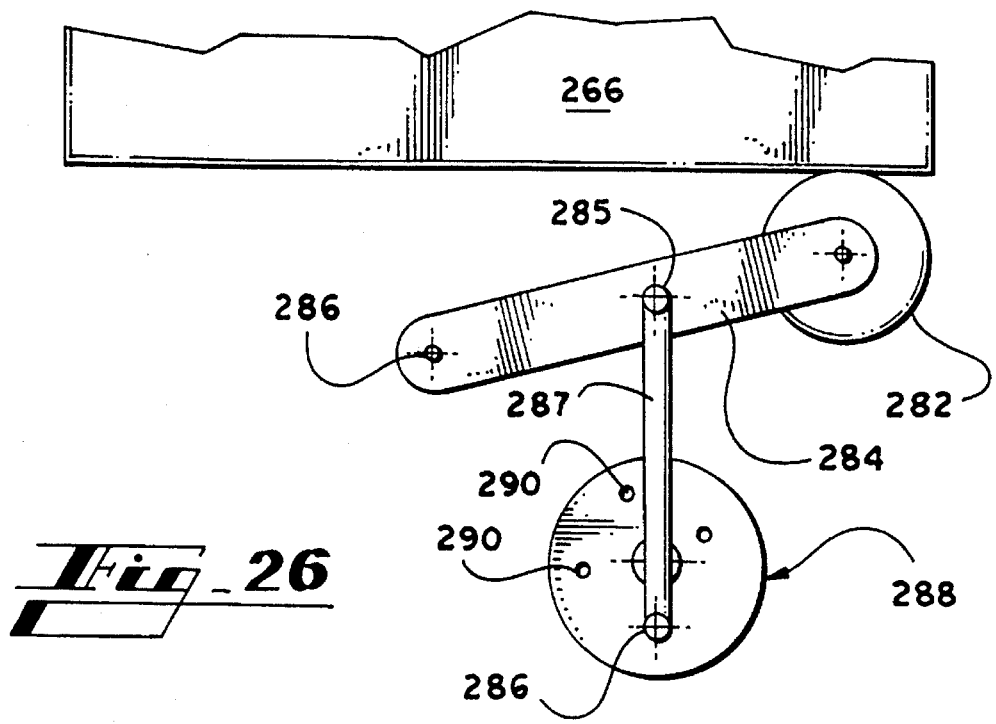
Fig_26
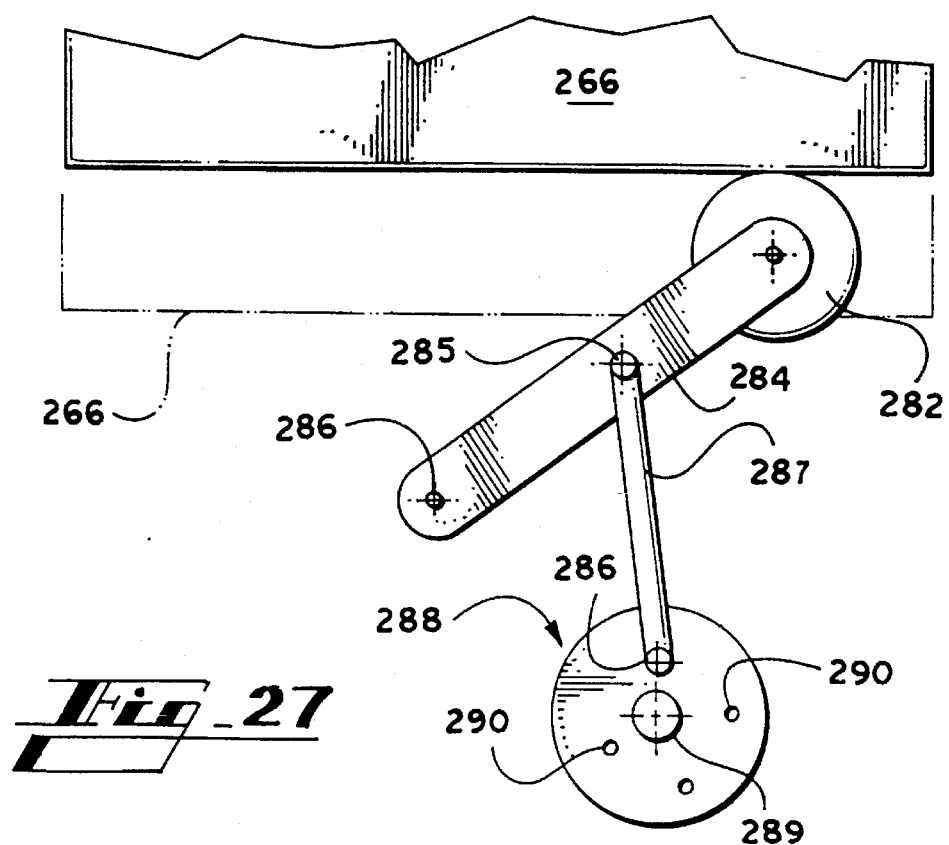
Fig_27

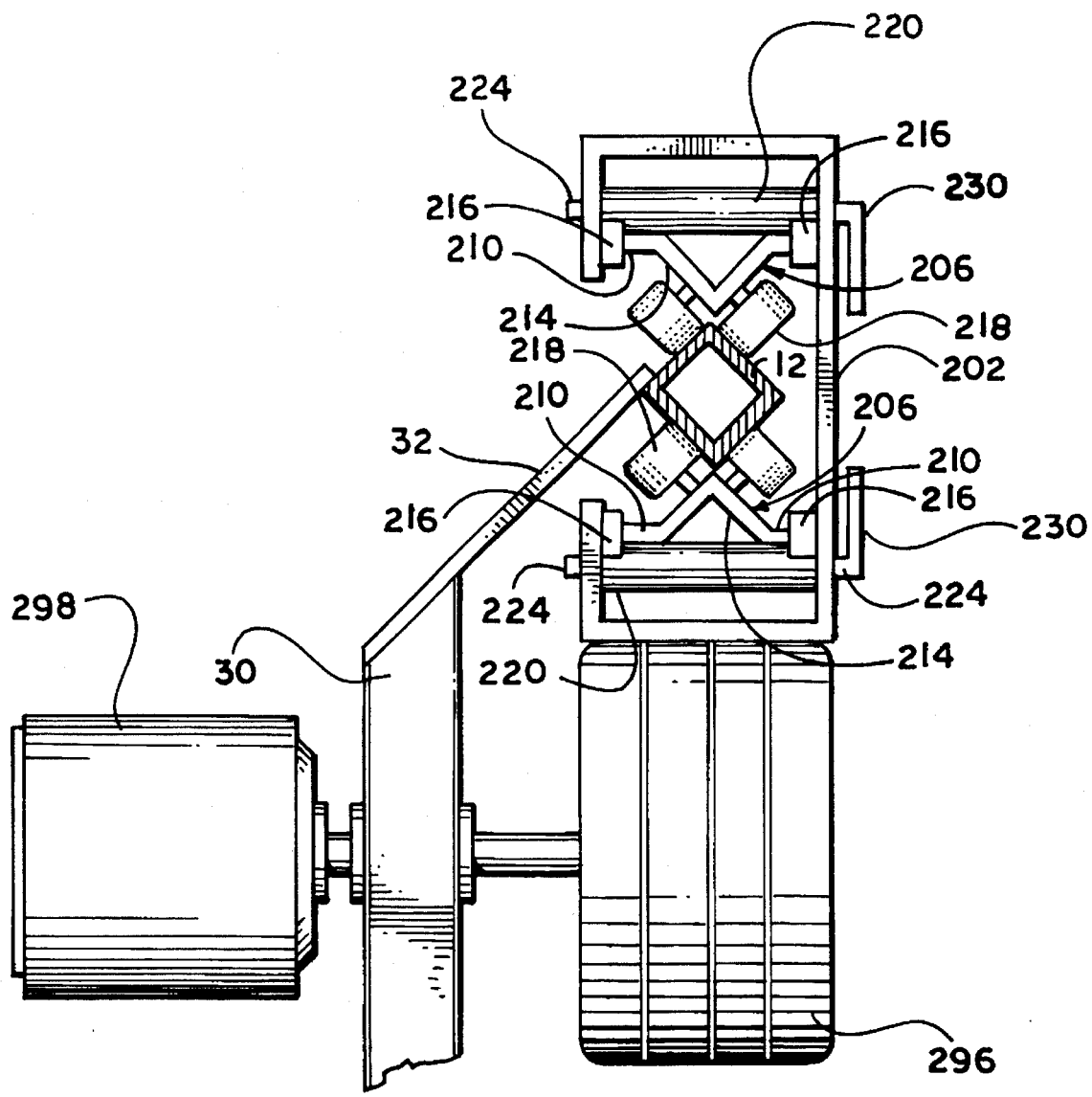
Fig_28

1

TILTING TRAY PACKAGE SORTING APPARATUS

REFERENCE TO RELATED APPLICATION

This is a continuation-in-part of application Ser. No. 08/154,207, filed Nov. 17, 1993.

TECHNICAL FIELD

The present invention relates to automatic sorting of items such as small packages into groups bound for different geographical locations, and more particularly relates to an automatic sorting apparatus using tilting trays which receive items from input conveyors and deposit them into designated output chutes or bins under programmed control.

BACKGROUND ART

Tilt tray sorters have been available for many years. Such systems are useful in sorting small packages for delivery to different regions, such as zip code areas. Under control of a computer or programmed logic controller, packages may be identified or coded as they enter the system, and then tracked for output at a chute or bin corresponding to the coded destination.

It is known to form a loop of linked carriages running along a loop of track. A human operator or automatic equipment loads items onto trays mounted on the carriages at one point around the loop, and the system automatically tilts the trays at various output locations adjacent to the track to discharge the packages. Many such systems drive the linked carriages by means of a chain or belt drive, which tends to be expensive and noisy. Such systems also occupy a large amount of space, and include complex mechanisms that are relatively difficult to repair.

At a package delivery company, the amount of time a sorter is shut down for repairs has a significant negative effect on the company's ability to meet delivery deadlines. Thus, reliability is a major goal in designing sorting systems. By simplifying mechanical assemblies and providing for easy substitution of failed parts, reliability can be increased and down time reduced. Furthermore, such companies must take steps to reduce noise levels in their facilities as governmental regulations concerning noise become more strict; thus, lowering noise levels in sorting systems is also a major goal.

The sorting system disclosed in U.S. Pat. No. 4,712,965 drives linked carriages around a dual rail track by means of one or more drive carriages. The drive carriages contain motors which derive power for operation from sliding contacts. The motors drive rollers which are pressed against a third rail by the weight of the motor. The carriages are separated by bumpers, and unloading is accomplished by driven conveyor belts mounted on the carriages, rather than by tilting trays.

Another system of looped carriages, but including a tilting tray mechanism, is disclosed in U.S. Pat. No. 5,054,601, which is incorporated herein by reference. The carriages are driven by induction motors positioned beneath the path of the carriages. A conveyor and overhead loader mechanism automatically load the carriages and shaft encoders monitor the speed of the carriages along the looped track. Rollers mounted on the carriages interact with cams provided along the track to unload the trays at their predetermined destination. The loading and unloading functions are under computer control. A latch mechanism holds the trays in a tilted position until they are straightened by a return mechanism.

In those prior art systems which drive a series of carriages by means of a chain or belt positively connected to the carriages, there is no need to link the carriages. In fact they may be spaced apart along the chain to avoid interaction. However, in some prior systems in which the train of carriages has been pulled by a locomotive carriage or by induction, the carriages must be linked. The linkage between carriages is a source of wear and noise. Therefore, a mechanical joint consisting of multiple interacting metal or plastic parts must be designed to reduce friction and possibly lubricated. Even then, the wear and noise problems associated with each linkage can only be alleviated, not eliminated.

Tilting tray sorting systems are also shown in U.S. Pat. Nos. 4,089,404; 5,018,928; and 4,982,828. The latter patent discloses a mechanism which tilts the trays by moving rollers mounted along the track into the path of cam surfaces on the edges of the trays.

A problem with the tilt tray sorters is that the speed of the tilt trays has been the limiting factor on the operation of the lines. The time it takes to tilt the trays and allow the packages to slide off does not permit the system to operate fast enough to run the lines at the higher rates made available by automation and electronic controls. One of the reasons for the slow speed of the tilt trays is the high degree of tilt (20–40 degrees) of the tray required to discharge the items it carries.

Because the mechanical tilt mechanisms used in contemporary tilt trays have not been able to sustain high speed travel, some manufacturers have offered powered discharge of the items with a belt or powered rollers. However, such systems are often expensive and can be unreliable due to power and signal transmission through a rail. There is a need for a more reliable, inexpensive way to provide quick discharge from a sorting system.

Another problem which arises in the field of automatic sorting is how to handle and sort large, irregularly shaped items. The prior systems noted above generally are unable to handle such irregular items.

As may be seen from the foregoing, prior sorting systems are complex both mechanically and electrically, require a relatively large amount of floor space for the volume of items that can be sorted, require significant maintenance, and by their nature are slow and noisy. There has been a need in the art for a sorting system that is simple in construction, is easy to maintain and keep on line, provides a high throughput of sorted items per occupied floor space, and operates at high speed with low noise levels.

SUMMARY OF THE INVENTION

The present invention provides an improved sorting system which uses a simple, inexpensive construction, may be easily maintained by substitution of components, increases throughput by providing a double tier of tiltable trays, employs a unique drive mechanism, and decreases noise levels by employing a flexing linkage with no moving parts between carriages and by employing a low-noise drive mechanism. In addition, the invention provides a high speed, gravity tilt tray. The tilt tray features a convex carrying surface which allows for quick discharge of items on the tray with relatively little tilt angle. These features individually and in combination are aspects of the present invention.

More specifically described, the present invention provides an apparatus for transporting objects, the apparatus including a track and a plurality of carriages mounted for movement along the track. Each of the carriages includes a tiltable object-holding platform and a frame for engaging the track. The object-holding platform defines a convex carrying surface for the objects, allowing the objects to be destabilized. A selectively-positionable retainer is located at a first end of the convex carrying surface, the retainer operable to two different positions: a first position in which the retainer is set forth in the path of an object at the first end of the carrying surface such that the retainer discourages discharge of the object off the first end of the carrying surface; and a second position in which the retainer is removed from the path of the object moving toward the first end of the carrying surface. In the second position, the object is free to discharge off the first end of the carrying surface.

The object-holding platform may be pivotably mounted to the frame and operatively associated with a cam surface. A transfer mechanism may be provided which is operative to unload an object from the carriage and includes a cam follower selectively positionable in the path of the cam surface.

A second selectively positionable retainer may be located at a second end of the convex carrying surface, the second retainer is also operable to two different positions: a first position in which the second retainer is set forth in the path of an object at the second end of the carrying surface such that the second retainer discourages discharge of the object off the second end of the carrying surface; and a second position in which the second retainer is removed from the path of the object moving toward the second end of the carrying surface such that the object is free to discharge off the second end of the carrying surface.

The first and second retainers may be provided on a retaining tray. The retaining tray may extend along the carrying surface and be attached to the first retainer, the retaining tray being biased away from the second end of the carrying surface and defining the cam surface, such that positioning the cam follower in the path of the cam surface lifts the retaining tray to engage and lift the second end of the carrying surface while lowering the retainer out of the path of the object. Thus, positioning the cam follower in the path of the cam surface operates to discharge the object from the carriage.

The present invention further provides an apparatus for sorting objects, the apparatus including a track and a plurality of carriages mounted for movement along the track. Each of the carriages defines an object-holding platform defining a carrying surface and mounted along a first axis. A retaining tray is pivotably mounted on the carriage along a second axis, the second axis being substantially parallel to the first axis and the retaining tray defining first and second retainers. The retaining tray is selectively positionable to two positions relative to the carrying surface. In the first position, the first retainer is set forth in the path of an object moving toward a first end of the carrying surface and the second retainer is set forth in the path of an object moving toward a second end of the carrying surface such that the first retainer discourages discharge of the object off the first end of the carrying surface and the second retainer discourages discharge of the object off the second end of the carrying surface. In the second position, the first retainer is moved from the path of the object moving toward the first end of the carrying surface such that the object is free to discharge off the first end of the carrying surface.

The present invention further provides an apparatus for transporting objects, the apparatus including a track and a carriage for moving along the track and transporting the objects. The carriage includes a frame and a first bearing assembly linked to the frame for engaging a first side of the track. A second movable bearing assembly is provided which is positioned between the frame and the second side of the track. A slack control device is positioned to bias the second bearing assembly against the track.

The present invention further provides an apparatus for transporting objects, the apparatus including a track and a carriage for moving along the track and transporting the objects. The carriage includes a frame and a first bearing assembly linked to the frame for engaging a first side of the track. A second bearing assembly is slidably mounted to the frame and a cam surface is selectively positionable against a location on the second bearing assembly. The cam surface is operative to adjust the distance between the first bearing assembly and the second bearing assembly such that the second bearing assembly may engage the track.

Thus, it is an object of the present invention to provide an improved automated sorting system.

It is a further object of the present invention to provide a sorting system for small items or packages which sorts such items at a high rate per floor area occupied by the system.

Another object of the present invention is to provide a tilt tray which is capable of quickly discharging items on the tray.

Still another object of the present invention is to provide a tilt tray which requires very little tilt to discharge a package.

Another object of the present invention is to provide automatic adjustment for wear in a bearing assembly mounted for movement along a track.

Other objects, features, and advantages of the present invention will become apparent upon review of the following description of preferred embodiments and the appended drawing and claims.

BRIEF DESCRIPTION OF THE DRAWING

FIG. 1 is a diagrammatic top plan view of a sorting system embodying the invention;

FIG. 2 is a pictorial view of the sorting system of claim 1, with parts removed to show detail;

FIG. 3 is a end view of a carriage of the sorting system of claim 1, also showing the tilting actuator and drive mechanism;

FIG. 4 is a outer side elevation view of a section of the sorting system of claim 1, with parts broken away to show interior detail;

FIG. 5 is a end elevation view of a carriage with the tilting actuator positioned to tilt the tray;

FIG. 6 is a diagrammatic view of a cam surface of a tray interacting with a cam follower of the tilting mechanism;

FIG. 7 is a diagrammatic view of a cam surface of a tray interacting with a cam follower of the tilting mechanism at a time subsequent to that shown in FIG. 6;

FIG. 8 is a diagrammatic view of an alternate embodiment of a tray cam surface for use with carriages that can travel in reverse;

FIG. 9 is a end elevation view of a pair of adjacent carriages (upper and lower) aligned with input conveyors;

FIG. 10 is a end elevation view of a pair of adjacent carriages (upper and lower), the trays of which have been tilted for depositing parcels onto output conveyors;

FIG. 11 is a diagrammatic top plan view of adjacent carriages linked by flexible bumpers;

FIG. 12 is side view of the carriages of FIG. 11;

FIG. 13 is a pictorial view of a flexible bumper being inserted into brackets mounted on adjacent carriages;

FIG. 14 is a side view of a removable rail section;

FIG. 15 is an end view of the attachment of the removable section of FIG. 14 to a post;

FIG. 16 is an end elevation view of an alternate rail construction;

FIG. 17 is a diagrammatic side view of a second embodiment of a sorting system utilizing suspended platforms;

FIG. 18 is an end sectional view of the sorting system of FIG. 17;

FIG. 19 is an end view of a suspended platform including motorized rollers for unloading items;

FIG. 20 is an end view of a suspended platform including a motorized conveyor for unloading items;

FIG. 21 is a flow chart outlining operation of the sorting system under control of a digital controller;

FIG. 22 is an end view of a third embodiment of the carriage of the present invention, with a permanent retainer removed for detail;

FIG. 23 is a side view of the carriage of FIG. 22, with part of the frame removed for detail;

FIG. 24 is an end view of the carriage of FIG. 22, with the carriage in the discharge position;

FIG. 25 is a perspective view of the lower carrying wheel cartridge of the carriage of FIG. 22;

FIG. 26 is a side view of the trip mechanism for use with the carriage of FIG. 22, with the crank positioned such that the lever arm extends its minimum height; and FIG. 27 is a side view of the trip mechanism of FIG. 26 with the crank positioned such that the lever arm extends its maximum height.

FIG. 28 is an end view of an embodiment of the carriage of the present invention, with a permanent retainer removed for detail, and with adjustable carrying wheel cartridges on both sides of the rail.

DETAILED DESCRIPTION

Referring now in more detail to the drawing, in which like numerals refer to like parts throughout the several views, FIG. 1 shows an automatic sorting system 10 embodying the present invention. With reference to FIGS. 1 and 2, the sorting system 10 includes a monorail 12 and a line or train of carriages 14 mounted for travel along the monorail 12. In the preferred form shown, the monorail forms a closed loop, and the carriages fill the monorail. Thus, the carriages 14 may be driven along the monorail in one direction by a drive mechanism 16, to be described in detail below. The carriages 14 travel through an input section 18 at which they are loaded with items, such as parcels to be delivered to addressee destinations, and then through output sections 20. At the output sections 20, the items are removed from the carriages by tilting mechanisms 22 which remove the items at an output chute corresponding to the item's destination, in a manner described below.

Other subassemblies of the sorting system 10 shown in FIG. 1 include a return mechanism 24, which prepares the carriages to receive new items as they return to the input section 18, and a carriage tracking station 26 which positively locates a carriage carrying a particular item so that a controller (not shown) including a digital processor may cause the item to be sorted to the correct destination. The subassemblies thus far noted and shown diagrammatically in FIG. 1 will now be described in detail.

Referring now to FIG. 3, the monorail 12 is supported by a plurality of support posts 30. A suspending bracket 32 extends from each post 30 and is attached, such as by welding, to the monorail 12, to hold the monorail 12 in a position spaced horizontally from the posts 30. In the preferred embodiment shown, the monorail 12 consists of a square steel extrusion held by the brackets 32 in a diamond configuration, that is, with opposing corners of the square cross section aligned vertically. Other metals or suitably strong materials may be utilized, and the beam may be hollow as shown or solid. An alternate embodiment of a monorail 34, designed for greater stability, is shown in FIG. 16. In this embodiment, a rectangular box beam 35 is attached to the posts 30 by a flanged support bracket 38. L-shaped extrusions or angle irons 36 are welded to the top and bottom surfaces of the box beam 35. Thus, the modified monorail 34 is an extended version of the square monorail 12.

A removable section 40 of the monorail 12 is shown in FIGS. 14 and 15. A pair of special suspending brackets 42 are attached to the ends of the removable section 40 and the main monorail 12. Both of the brackets 42 are bolted to a slotted bracket 43 which is attached to the post 30. The brackets 42 slide into a slot 44 formed in the bracket 43, and are held in place by bolts 45 which pass through mating holes in the brackets 42 and 43. By removing the bolt 45 which attaches the removable section to the post 30, the removable section 40 can be slid out of the slot 44 in order to remove and replace carriages on the monorail 12. This procedure reduces down time in repairing carriages, since a carriage can be removed and replaced without any disassembly of the carriage itself.

Returning to FIGS. 2 and 3, the train 14 of carriages is formed of a plurality of lower level carriages 50 and a plurality of upper level carriages 51. Both types of carriages 50 and 51 have a frame 52 in the shape of an elongate "C", which wraps around the monorail with the open side of the "C" facing the posts 30 and receiving the monorail 12 and support brackets 32. The frame 52 may be constructed of bent steel or another metal such as aluminum, or formed of any suitably strong material. Four axle bolts 54, shown in FIGS. 3 and 4, extend across the frame 52, two axles on either side of the monorail 12. Four grooved rollers 55 are rotatably mounted on the axles 54 so as to engage the upper and lower sides of the monorail 12 with the corners of the monorail being received in the grooves of the rollers. The rollers 55 are provided with ball bearings (not shown) and preferably are made of urethane for noise reduction, but can be constructed of metal. Spacers 57 on either side of the rollers center the rollers within the frame 52. The axles and rollers are positioned so that the rollers snugly fit onto the monorail 12 in a manner which permits free rotation of the rollers and smooth travel of the carriage along the monorail 12, without excess vibration.

The train 14 of carriages 50 and 51 preferably alternates upper and lower level carriages and completely fills the looped monorail 12 with carriages. In such a configuration, it is not necessary to physically connect the carriages to one another. Rather, a bumper 58, as shown in FIG. 4, may be fixed to one end of each carriage to cushion its contact with the adjacent carriage. If the monorail is not completely filled by an even or odd number of carriages, the extra space can be filled by a large bumper on one of the carriages or by a filler carriage having a special length. In an alternate embodiment, described below, the carriages are resiliently attached to one another. Furthermore, it should be understood that many advantages of the present invention can be incorporated in a monorail system which is not a closed loop. Also, the carriages might move in reversible directions, or the monorail could change elevation along its course or follow a serpentine path.

The lower level carriages 50 and upper level carriages 51 include many common structural characteristics. A lower level carriage 50 will be described first, and the differences in the upper level carriage 51 will be noted. Each lower level carriage 50 includes a tilting tray or platform 60 pivotally mounted to the frame 52 for tilting about a longitudinal axis, that is, an axis along the monorail 12. The tray 60 preferably is made of fiberglass but may be constructed of metal, plastic, or wood. The tray is preferably rectangular and longitudinally concave toward its center to cause automatic centering of parcels as they are loaded onto the tray.

A pair of pivot brackets 62 extend downwardly from the bottom of the tilting tray 60 and are attached by pivot pins 65 to a corresponding pair of pivot brackets 63 extending upwardly from the top of the frame 52. The position of the tilting tray 60 is controlled by a detent mechanism 67, which includes a detent housing 69 projecting downwardly from the center of the tilting tray 60 between the pivot brackets 62. A downwardly opening cavity 62 in the detent housing 69 receives a spring-loaded square tube 70 which carries a cam follower 72 that is movable against the pressure of the spring 70. As best shown in FIG. 3, a tray alignment cam 74 is mounted to the top of the carriage frame 52 under the detent mechanism 67. The alignment cam 74 is shaped to have a central recess 76, an outer recess 77 separated from the central recess by a hump 78, and an inner recess 79 separated from the central recess by a hump 80.

The sides of each tilting tray 60 are bent down to define a pair of tray tilting cam surfaces 85 along the longitudinal side edges. The profile of the cam surfaces 85 is shown in FIGS. 6 and 7. The cam surfaces slope downwardly away from the leading end of the tray 60 (defined with respect to the direction of travel of the carriage) to a low point at the trailing end of the tray. When sufficient force is exerted on the side edges of the tray 60 via the cam surfaces 85 by the tray tilting mechanisms 22, the force of the spring 70 is overcome and the follower 72 crosses one of the humps 78 or 80. The force of the spring 70 then causes the tray to continue tilting until the follower 72 rests in the center of either the inner recess 79 or the outer recess 77 depending on which way the tray has been tilted.

If the monorail sorting system has a reversible direction drive, the tray tilting cam surface will have a profile 87 as shown in FIG. 8. As shown, the cam surfaces slope from both the leading and trailing ends of the tray 60 downwardly to a low point at the center of the tray.

Each upper level carriage 51 includes an upper level tilting tray 90 which is elevated above the frame 52 by a tray elevation post 92. The height of the upper trays 90 can be varied, but preferably is eighteen inches or more. A cross beam 93 attached to the elevation post 92 extends in a longitudinal direction and carries the pivot bracket 63 and the tray alignment cam 74, which have the same structure as provided for a lower level carriage 50. The upper level trays 90 also include cam surfaces 85 for tilting and a detent mechanism 67 identical to that provided for lower level carriages.

In the preferred embodiment, the upper level tilting trays 90 extend longitudinally over adjacent lower level trays 60. Also, the lower level trays 60 of every other carriage extend longitudinally over adjacent carriages, beneath the upper level trays 90. The preferred configuration of adjacent carriages and upper and lower level trays can be seen in FIGS. 2 and 4. This configuration has great advantages in that a greater density of items or parcels can be carried per unit length of monorail, reducing the square footage of floor space needed to house the monorail sorting system for a given desired rate of item handling. Furthermore, if the monorail must make tight turns, the carriages individually can be short, such as about one foot long, while the trays may be almost twice the length of the carriages. Preferably, about four inches clearance is left between adjacent trays to allow for support posts and angling on turns.

The drive mechanism 16 is best shown in FIGS. 2 and 3. It provides a simple and reliable way to move the carriages around the monorail without complex chains, belts or gears as used in prior sorting mechanisms. A drive roller 102, preferably an inflated tire about two feet in diameter, is rotatably mounted on a shaft (not shown) passing through a shaft carrier 103 below the carriage frames 52. The shaft carrier 103 is pivotally connected to one of the posts 30 about horizontal pivot pins 105 aligned with a pivot axis parallel to the monorail 12. The shaft carrier 103 then extends beyond the post 30 into a speed reducer 107 associated with an electric motor 108 for driving the shaft.

It will thus be seen that the drive connection between the drive mechanism 16 and the train 14 of carriages 50 and 51 is simply the frictional contact between the outer surface of the tire 102 and the lower surfaces of the carriages. Since the heavy motor 108 is cantilevered at the end of the shaft carrier 103 opposite the tire 102, the weight of the motor 108 urges the tire 102 against the carriage frame 52. The outer periphery of the tire 102 preferably consists of a high friction elastomeric material or tread.

The drive mechanism 16 can be mounted at any location around the monorail loop, and several identical assemblies may be used with one monorail loop in order to provide redundancy and to even out the propulsion forces. As shown in FIG. 4, the tire as it rotates engages one carriage after the other and propels the entire carriage train 14 forward at an appropriate speed, which may be about 114 fpm. In order to provide a reversible capability for the carriage train 14, it is only necessary to provide a reversible motor.

Referring now to FIG. 9, the input section 18 includes a lower input conveyor 112 and an upper input conveyor 113. The conveyors 112 and 113 are short metering conveyor assemblies that are intermittently operable under the control of the computer controller. A pair of stabilizing rails 115, one on each side of the monorail 12, extend just below each tilting tray 60 and 90. The rails 115 are supported by members (not shown) extending upwardly from the floor or from the posts 30. The conveyors 112 and 113 extend to a position closely adjacent to the outer side of the tilting trays, so that parcels 114 can be delivered onto the trays. The stabilizing rails 115 prevent the trays from tilting as a result of the impact and weight of the parcels 114. Thereafter, the detent mechanism 67 is sufficient to keep the tray horizontal until the tray is tilted to discharge a parcel. If desired, rollers or wheels positioned below the trays may be used to stabilize the trays during loading instead of the rails 115.

The carriage tracking station 26 is located immediately downstream of the input section 18. As shown in FIG. 2, a handshake photocell transmitter and detector 118 are positioned across the path of the carriages. The photocell 118 detects the passage of each carriage and provides an appropriate signal to the controller. A shaft encoder 120 includes a wheel which engages the bottom of the carriage frames 52 and provides an output signal corresponding to the distance traveled by the carriages along the monorail. The role of these components in tracking loaded carriages to the proper output chutes will be described in detail below.

Details of the tray tilting mechanisms 22 are shown in FIGS. 3 and 5. Each mechanism 22 consists of a two-position cam following assembly which may be mounted to engage one of the cam surfaces 85 of either the lower trays 60 or the upper trays 90. As shown in FIG. 3, a lower tilting cam follower 125 is rotatably mounted on a shaft 126 that is rigidly connected to a vertical arm 128. The arm 128 is suspended from above the monorail 12 on a pivot 129. A solenoid 130 has an extending plunger pivotally connected at 132 to the arm 128. A spring 133 normally draws the arm 128 and cam follower 125 into the retracted position shown in FIG. 3, whereas operation of the solenoid 130 rotates the cam follower 125 into an operative position as shown in FIG. 5, in the path of the cam surfaces 85. Alternately, it would be possible to employ a conventional solenoid of the type which is stable in both positions, eliminating the need for the spring 133.

Referring to FIG. 2, a tray tilting mechanism 22 positioned in the path of the lower tray 60 is shown along side such a mechanism suspended at a height in the path of the upper trays 90. The latter mechanism includes a shorter suspending arm 136 and a cam follower 135. Whether positioned to tilt upper or lower trays, the mechanisms 22 are constructed and operate in a similar manner. FIGS. 6 and 7 show the action of the cam follower 125 on the cam surface 85 as the tray 60 moves to the right. The side of the tray engaging the cam follower 125 is lifted by the pressure of the cam follower 125 on the cam surface 85. As noted above, this action tilts the tray until the follower 72 of the detent mechanism 67 leaves the central recess 76 of the tray alignment cam 74.

Details of the output sections 20 may be seen in FIGS. 2 and 10. Lower output chutes 140 and upper output chutes 141 are positioned along both sides of the monorail 12 and, are aligned to receive parcels sliding off the trays 60 and 90, respectively, when such trays have been tilted by one of the tilting mechanisms 22. A tilting mechanism 22 is associated with each output chute 140 and 141. If a parcel 114 is destined for an output chute 141 on the inside of the monorail 12, the cam surface 85 on the outside of the monorail 12 will be engaged by a cam follower 135 just before the carriage holding the parcel reaches the output chute. The cam follower 135 will cause the detent mechanism 67 to jump into the outer recess 77 of the tray alignment cam, and the tray 90 will tilt to the inside of the monorail, into the position shown in FIG. 10. The tray tilts to enough of an angle (preferably about 15°) that the parcel 114 will slide off the tray onto the output chute 14 1 under the force of gravity. If the parcel is destined for one of the output chutes on the outside of the monorail, the tray is tilted so that the detent mechanism is moved to the inner recess 79 of the cam 74, tilting the tray to the outside in alignment with an output chute 140, as shown in connection with the lower tray 60 shown in FIG. 10.

As the carriages approach the input section 18, most or all of the trays 60 and 90 will have been tilted by the tray tilting mechanisms 22. In order to prepare the trays for the receipt of new parcels, the tray return mechanism 24, shown diagrammatically in FIG. 2, is positioned upstream of the input section 18. Four fixed tray return rollers 145 are mounted on fixed support arms 147 to position the rollers 145 in the path of the cam surfaces 85 of the trays 60 and 90 in all four possible tilted orientations of the trays. The rollers 145 act as cam followers in the manner shown in FIGS. 6 and 7, and cause the detent mechanisms to return to the central recess 76 of the tray alignment cam 74. This occurs before the trays pass over the stabilizing rails 115 described above. Alternatively, fixed ramps may be used for the tray return function in lieu of the rollers 145.

An optional linkage 150 for connecting adjacent carriages as shown in FIGS. 11–13. A roughly Z shaped bracket 152 is attached to the inner side of each carriage frame 52 at both ends of the carriage. The brackets are mounted to define a pocket opening toward the next adjacent carriage, and are aligned so that such openings face one another. An elastomeric bumper 154 is shaped to define two enlarged ends 155 and a central bumper protrusion 156 which extends outwardly between the ends 155. As shown in FIG. 13, the bumper 154 is slidably inserted under the brackets 152 of two adjacent carriages, so that the enlarged ends 155 are received in the facing pockets defined by the brackets 152. At the same time, the protrusion 156 is inserted between the ends of the carriage frames 52 to provide a bumper cushion between the carriages.

An example of the positioning of a linkage 150 is shown in FIG. 2. Since the bumper member 154 is formed from rubber or some other pliable material, and is positioned around the interior of the carriage train 114, the linkages 150 are able to flex as the carriages pass around curves of the monorail 12. This enables the carriages to be linked and cushioned from one another without the need for mechanical joints, hinges, or the like.

Second Embodiment

An alternate embodiment of the present invention is shown in FIGS. 17–20, which portray a suspended automatic sorting system 160. In contrast to the support post 30 of the first embodiment, downwardly extending posts 162 suspend the monorail 12 from a ceiling or other overhead support structure. As shown in FIG. 18, the alternate drive mechanism includes a drive tire 165 mounted on a shaft carrier 166 which is pivotally connected at a pivot 168 associated with a suspending post 162. However, the drive tire 165 rests on the upper surface of the carriage frames 52, and a drive motor 170 is attached to the drive shaft carrier 166 on the side of the drive tire 165 opposite to the post 162. Thus, the weight of the motor 170 presses the drive tire 165 down against the carriage frames 52.

The purpose of the suspended sorting system 160 is to carry large or irregular items on suspended tray assemblies 175 hanging below the carriages frames 52. Each carriage has a basic frame 52 and system of rollers 55 which surround and engage the monorail 12 in the same manner as described above in connection with the first embodiment. Each suspended tray assembly 175 includes a pair of suspending arms 177 which are L-shaped as shown in FIG. 18. The suspending arms 177 for a tray assembly 175 may be attached to carriage frames 52 which are separated by one or more filler carriages, in order to provide a carrying surface that is longer than a tray capable of being supported by a single carriage.

In the variation shown in FIG. 18, a platform 178 is supported by a pair of suspending arms 177. The vertical member of the suspending arms is attached at the inner, lower corner of carriage frame 52 by a spring-catch hinge 181. The hinge 181 is of a conventional construction which holds its position until rotated a short distance upwardly, after which it releases to rotate downwardly past its initial holding position. In this embodiment, the tray tilting mechanism includes a roller 182 which may be moved between a retracted position and an extended position in the path of the platforms 178, by a mechanism similar to that used to operate the cam follower 125 in the first embodiment. Alternately, the roller 182 could be movable from a retracted position directly below the path of the carriages. The platform 178 may be provided with a bevelled leading edge 179 for initial engagement by the roller 182. The roller 182 is positioned so that it lifts the platform 178 a short distance to disengage the spring-catch hinge 181 as the platform "climbs" the roller. After the platform 178 clears the roller 182, the weight of the platform and an item 184 on the platform moves the platform downwardly into a position shown in phantom lines in FIG. 18. This lower position is in alignment with an output chute 140 which guides the item 184 to its destination.

Another variation of the suspended tray assembly is shown in FIG. 19. Hem, suspending arms 185 are rigidly attached to the inner surface of the carriage frames 52, and the platform 178 is provided with conventional motorized rollers 186 to provide a conveyor bed. The motorized rollers 186 are energized as the platform 178 is aligned with the correct output chute 140 to transport the item 184 off of the platform 178 onto the chute 140. This energization is accomplished by providing a pair of sweep contacts 190 on either the suspending arms 185, the platform 178, or the carriage frame 52. The contacts 190 are wired (not shown) to the motorized rollers 186. A pair of mating supply contacts 192 is mounted on support structure (not shown) in the path of the sweep contacts 190. A set of the supply contacts 192 may be associated with each output chute 140. The computer controller selectively provides power to the correct set of contacts when a platform 178 carrying an item destined for the output chute 140 approaches. Or, the supply contacts may be mounted to be movable into the path of the sweep contacts when a particular platform 178 is approaching the output chute 140 onto which the item on the platform is to be unloaded. A solenoid actuating system of the type shown in connection with the tilting mechanisms 22 of the first embodiment could be used to move the supply contacts 192. Typically, a 12 or 24 volt power supply is required for the motorized rollers 186.

A third variation of the suspended tray assembly is shown in FIG. 20, in which the motorized roller bed 186 of FIG. 19 has been replaced by a motorized conveyor belt 195 having drive rollers at either end. Operation of the conveyor belt to unload items from a platform 178 may be accomplished using contacts 190 and 192 as described above.

By extending the suspended tray assembly 175 below three or more carriages, it may be made long enough to carry large, bulky and irregular items. For example, the tray may be three to four feet long and 18 inches wide. The length depends on the number and size of the filler carriages positioned between the carriages which support the suspending arms. The suspended tray assembly 175 is also more practical for carrying heavy loads because such loads are easier to hang than to support on a platform from below.

Third Embodiment

An alternate embodiment of a carriage for use in the sorting system 10 is shown in FIGS. 22–27, which portray a tilt tray carriage 200. The carriage 200 provides a high speed parcel discharge feature, as well as an automatic adjustment and gripping feature for a rail. The carriage 200 is designed to travel along a monorail 12, shown in the drawing as supported on a post 30 by a bracket 32. The carriage 200 has a frame 202 in the shape of an elongate "C", with the open side of the "C" facing the post 30 and receiving the monorail 12 and support brackets 32.

As shown in FIGS. 22 and 23, the carriage 200 includes bearing assemblies for contacting the monorail 12 in the form of an upper carrying wheel cartridge 204 and a lower carrying wheel cartridge 206 within the frame 202, above and below the monorail 12, respectively. The right angles 212, 214 point toward the monorail. The wheel cartridges 204, 206 include feet 208, 210 extending from right angles 212, 214, respectively. The feet 208 on the upper carrying wheel cartridge 204 are fixed to the upper surface of the frame 202 by welding, bolts, or other suitable attachments. The lower carrying wheel cartridge 206 includes a unique height adjustment feature, described below, and extends between retaining tabs 216, two each of which are located on the back and front of the frame 202.

A plurality of wheels 218 are mounted for rotation on adjacent sides of the right angles 212, 214. The wheels 218 are preferably urethane. As can best be seen in FIG. 22, these wheels 218 are arranged to engage the flat surfaces of the square monorail 12. As will be described in detail below, the ability to adjust the height of the lower carrying wheel cartridge 206 provides an automatic gap adjustment feature such that the wheels 218 engage the monorail 12 with pressure. The gap adjustment feature biases the wheels 218 against the monorail 12, and allows the carriage 200 to be used on a variety of different sized and shaped monorails. The main advantage of the automatic adjustment feature is that urethane rollers used in the past have worn over time and created clearance between the rail and the wheels. This clearance can cause a corresponding rattling, noise or vibration. By providing the adjustment feature, the wheels 218 remain against the surface of the rail despite changes in the diameter of the wheels.

Turning now to FIG. 25, details of the lower carrying wheel cartridge 206 and the unique automatic gap adjustment feature are shown. The lower carrying wheel cartridge 206 is suspended on two cylinders 220, 222. The cylinders 220, 222 preferably extend transversely under the back and front ends of the lower carrying wheel cartridge 206, so that the cartridge may remain stable.

Pins 224, 226 extend eccentrically out of both ends of the cylinders 220, 222, respectively, and are fixed to the cylinders such that rotation of the pins causes a corresponding rotation of the cylinders. The pins 224, 226 are mounted for free rotation within holes on opposite sides of the frame 202.

Lever arms 230, 232 are fixed to the pins 224, 226 at ends which extend out of the side of the frame 202 opposite the post 30. A slack control device in the form of a compression spring 234 extends between the two lever arms 230, 232 and biases the two arms away from one another. In the embodiment shown, the spring 234 may be any mechanical or electromechanical device that can offer a compression force, including but not limited to hydraulic cylinders, electrostatic cylinders, magnetic devices, and steel recoil springs.

The cylinders 220, 222 serve as cams and present camming surfaces on their outer diameters for engaging the feet 210 on the lower carrying wheel cartridge 206. The eccentric mounting of the pins 224, 226 relative to the cylinders 220, 222 causes the distance between the camming surface for each of the cylinders and the corresponding pin to increase or decrease, depending upon which portion of the surface is presented to the feet 210. Thus, as the point of contact between the camming surface for each of the cylinders 220, 222 approaches the point A on the outer diameter of the cylinders, the feet 210, and therefore the wheel cartridge 206, moves upward, or away from the respective pin 224, 226. Correspondingly, as the point of contact on the surface of each of the cylinders 220, 222 approaches the point B on the outer diameter of the cylinders, the lower carrying wheel cartridge 206 moves downward, or closer to the pins 224, 226. It can be appreciated that rotating the pins 224, 226 varies the height of the lower carrying wheel cartridge 206, or either end of the cartridge so that the cartridge may snugly engage the monorail regardless of small changes in the dimensions of the wheels 218.

Preferably, the camming surfaces of the two cylinders 220, 222 are set such that for a normal or average size of the monorail 12, the camming surfaces of the cylinders engage the feet 210 at some point between A and B on the camming surfaces, so that adjustments both up and down in the height of the lower carrying wheel cartridge 206 are within the range of movement of the spring. As can be seen in the example of FIG. 25, the normal point of contact for the cylinder 220 is the point C and the normal point of contact for the cylinder 222 is the point D. As such, counterclockwise rotation of the pin 224 (and the lever arm 230) and clockwise rotation of the pin 226 (and the lever arm 232) causes the lower carrying wheel cartridge 206 to rise, until the point of contact for each of the cylinders reaches a location between point C and point A at which the wheels 218 firmly contact the monorail 12 and preclude further rising. Contact with the point A represents the maximum "camming action" for the cylinders 220, 222. Likewise, clockwise rotation of the pin 224 (and the lever arm 230) and counterclockwise rotation of the pin 226 (and the lever arm 232) causes the lower carrying wheel cartridge 206 to lower under pressure from an enlargement of the monorail. Contact with the point B represents the minimum "camming action" for the cylinder. Preferably, the variance in size of the monorail 12 will not exceed the distance determined by the camming surfaces of the cylinders 220, 222 reaching the points A and B. It can be appreciated that the cartridge 200 with the adjustment feature may fit without modification any rail having right-angle contact surfaces along the top and bottom sides and not exceeding this distance.

From the foregoing discussion, it can be understood that the compression spring 234, by forcing the two lever arms 230, 232 apart, biases the point of contact of the camming surfaces on the cylinders 220, 222 with the feet 210 toward the point A on each of the cylinders. Thus, the compression spring 234 biases the lower carrying wheel cartridge 206 toward the upper carrying wheel cartridge 204, having the effect of closing any gaps that exist between the monorail 12 and the wheels 218, and biasing the lower wheels 218 against the bottom of the monorail, allowing for smooth and constant contact of the wheels 218 with the monorail 12. It is also to be understood that because each of the pins 224, 226 is free to rotate independently, each end of the lower carrying wheel cartridge 206 adapts independently to fit against the monorail 12.

For best results, a relatively constant force spring is used between the two lever arms 230, 232. It is to be understood that the camming surfaces on the two cylinders 220, 222 can be reversed and a tension spring may be used. In addition, the automatic gap adjustment feature of the present embodiment can be incorporated into a suspended monorail system, preferably by turning the frame 202 over so that the gap adjustment is along the top of the rail. Furthermore, the gap adjustment feature could be added to each side of the rail as is shown in FIG. 28.

The carriage system 200 also provides a unique tilt tray 250. The tilt tray 250 includes a plurality of elongate idler rollers 252 mounted longitudinally on a carrying idler tray 254. The elongate idler rollers 252 are free to spin on their central axes and, unlike other carrying idler trays, are mounted such that a line extending along the central axes of the rollers would be slightly curved, creating an upwardly convex carrying "surface" indicated by a dashed line 255 in FIG. 22. When viewing the tray 254 from the direction of FIG. 22, the idler rollers 252 in the center of the carrying idler tray 254 are slightly higher than the rollers at each of the ends of the tray, and each idler roller is progressively lower. Preferably, the difference in height between the center rollers 252 and the outer rollers is approximately ¼ inch.

A hub 256 extends from the bottom of the carrying idler tray 254 and is received between two flanges 258 extending upward from the frame 202. A pivot rod 260 extends through the two flanges 256 and the hub 258. Centering springs 262, 264 are provided on opposite sides of the hub 256 and extend from the carrying idler tray 254 to the frame 202 to bias the carrying idler tray to a substantially horizontal orientation.

A sheet metal retaining tray 266 having the shape of an elongate "W" is provided around and beneath the carrying idler tray 254. The retaining tray 266 includes openings (not shown) through which the hub 258 and centering springs 262, 264 freely pass. The retaining tray 266 is attached at a horizontal pivot 268 extending through the hub 256 along the bottom center of the carrying idler tray 254. Because of the slight upward curvature in the central portion of the elongate "W" of the retaining tray 266, the retaining tray hangs freely from the ends of the carrying idler tray 254, with a gap formed between the ends of the carrying idler tray and the ends of the retaining tray. Leaf springs 270, 272 positioned in this gap bias the retaining tray 266 away from the ends of the carrying idler tray 254 and keep the gaps on each end substantially the same when no other force is exerted on the tray 266. The leaf springs are attached at one end to either the tray 254 or the tray 266, and the other end presses against the other tray without being fixed thereto. The ends of the retaining tray 266 extend up and define retainers 274, 276, which, in a normal position, extend above the surface of the top of the idler rollers 252.

Permanent retainers 277 are provided at the front and rear of the carrying idler tray 254 and are attached to the carrying idler tray or to the hub 256. The retainers 277 extend upwardly to prevent a package 114 from sliding longitudinally off the rollers 252. As with the tilting trays of earlier embodiments, a series of discharge chutes 140, 141 are positioned to receive parcels 114 sliding off the carrying idler tray 254.

A trip mechanism 280 is provided underneath at least one side of the retaining tray 266. The trip mechanism 280 includes a roller 282 mounted on an axis 283 which is attached to a pair of lever arms 284. A fulcrum rod 285 extends between the two lever arms 284. The end of the lever arms 284 are pivotally mounted on a fixed pivot rod 286. As can be seen in FIGS. 26 and 27, a push rod 287 extends downward from a pivotal connection to the fulcrum rod 285 and is eccentrically attached at its other end to a crank 288. The crank 288 is mounted for rotation about an axel 289 and includes a plurality of holes 290 which vary in radial distance from the axel 289. The axel 289 is driven by a motor 294 through a gear reducer 292. The crank 288 may be inserted into any one of the holes 290 to adjust the travel of the roller 282 toward the tray 250.

A train of the carriages 200 may alternate upper and lower level carriages as has been described above, or may be spaced such that all of the carriages are approximately the same height. Furthermore, it should be understood that many advantages of the present embodiment can be incorporated in a monorail system having several different configurations. However, when describing the operation of the carriages 200, it will be assumed that the carriages extend above the monorail 12 (such as shown in FIG. 22).

As with the previous embodiments, the present embodiment includes a drive mechanism having a drive roller 296 which is operated by a motor 298. The weight of the motor 298 urges the drive roller 296 against the carriage frame 202. As the drive roller 296 rotates, it engages one carriage after another and propels the entire carriage train forward at an appropriate speed.

During operation of a monorail system including the carriages 200 with tilt trays 250, packages 114 are input at an appropriate input section onto the carrying surface 255 of the plurality of idler rollers 252. Preferably, the packages 114 are input over one of the retainers 274, 276. Because of the slight curvature of the rollers 252, the package 114 is destabilized and easily rolls back and forth between the retainers 274, 276, but is prevented from falling off the carrying idler tray 254 by the retainers. In addition, the permanent retainers 277 at the transverse edges prevent the package from slipping off the carrying idler tray 254 along the front and back of the carrying idler tray 254. As the package 114 moves back and forth across the carrying idler tray 254, the tray is held steady by the springs 262, 264.

The carriage tracking station, such as is described above, is located immediately downstream of the input section for the packages 114. Other appropriate tracking devices as described above are used to designate the proper output chute for the package as it is input on the tilt tray 250.

When the tilt tray 250 and carriage 200 approach the proper discharge chute 278, the motor 294 is engaged such that the reducer 292 turns the crank 288 a one-half turn, advancing the push rod 287 from the bottom dead center position of FIG. 26 to the top dead center position of FIG. 27. This advancement of the push rod 287 correspondingly pivots the lever arms 284 about the pivot rod 286, and thereby raises the trip roller 282 which presses the bottom of the retaining tray 266 upward. Thus, as the carriage 200 moves along the monorail 12, the roller 282 acts as a cam follower, getting in the path of and pressing against the bottom of the retaining tray 266, which acts as a cam surface.

As one side of the retaining tray 266 moves upward, the leaf spring 272 on that side is compressed and the gap between the inside right portion of the retaining tray 266, as shown in FIG. 24, and the lower right edge of the carrying idler tray 254 is substantially closed. Closing this gap causes a corresponding widening of the gap between the inside edge of the left side of the retaining tray 266 and the lower, left edge of the carrying idler tray 254. As can be seen in FIG. 24, the separation of the left side of the retaining tray 266 and the carrying idler tray 254 allows the leaf spring 270 to relax, or be in a less compressed state. The movement of the left side of the retaining tray 266 downward also moves the retainer 274 below the carrying surface 255.

Further pressure of the roller 282 upon the bottom right edge of the retaining tray 266 causes the carrying idler tray 254 to tilt about the pivot rod 260, compressing the centering spring 262 and tensioning the centering spring 264. This tilting of the carrying idler tray 254 causes the destabilized package 114 to slide to the left along the idler rollers 252 off of the tilt tray 250 and into the discharge chute 278 as shown in FIG. 24.

Continued rotation of the crank 288 moves the push rod 287 back into the position of FIG. 26, or bottom dead center, and allows the tray to return to the position of FIG. 22. The tilt tray 250 is then ready to receive another package.

The destabilized orientation of the package 114 on the idler rollers 252 allows a quick discharge of the package. The slight convex shape puts the package 114 in a position where it has few contact points (preferably only one or two) with the idler rollers 252, and therefore a minimum amount of friction for quick movement of the package 114. Thus, by slightly tilting the carrying idler tray 254, gravity overcomes the small friction and the package is easily discharged from the tray 254. It has been found that the destabilized condition of the rollers 252 allows a quick discharge of a package with as little as 5–7 degrees of tilt of the tray 254, compared to a necessary tray tilt of approximately 20–40 degrees for non-powered tilt trays in the prior art. By allowing less tilt for the tilt tray 250, the entire system may run at a much higher speed than normally achievable with prior art tilt trays and, as a result, improves productivity.

Operation

The automatic sorting system 10 (with trays 60 or trays 250) or 160 is operated under the control of a digital controller, which may be a programmed logic controller (PLC) or a general purpose microprocessor such as found in a personal computer. Methods for programming such controllers to operate a sorting system of the type disclosed herein are conventional and known to those skilled in the art. A flow chart of the general logic to be programmed into the controller is shown in FIG. 21.

The number of carriages and an identification code for each carriage are input into the controller memory, along with the identification of the carriage that is initially aligned with each input conveyor when movement of the carriage train begins. After the carriage train 14 starts, it moves continuously along the monorail 12. An operator places the packages 114 in single file order on one of the input conveyors 112 or 113. The operator then reads the label on each package and enters the destination zip code into the controller memory, as noted at Block 1 of the flow chart, using either a keypad or a voice recognition input device. As the carriage train 14 moves around the monorail 12, the shaft encoder 120 provides a signal representing its count to the controller, which is then able to determine at any given time the location of the carriages.

At Block 2 the zip code entered at Block 1 is stored in a sequential list. At Block 3, the controller calculates the number of encoder pulses that will occur between the location of the photocell 18 and the destination output chute 140 or 141 that is associated with the entered zip code. At Block 4, the controller checks its memory to determine whether the status of the next tray approaching the input conveyor is "empty" or "full." If the next tray is not empty, the controller holds operation of the input conveyor until it has an opportunity to check the next tray. If the approaching tray is empty, in Block 6 a signal is sent to operate the input conveyor to load the tray. The input conveyors are configured to operate rapidly and intermittently on command from the controller, which starts operation of the input conveyor shortly prior to the time at which the continuously moving carriage becomes aligned with the input conveyor. As the parcel 114 moves onto the tilting tray 60 or 90, the concave shape of the tray helps to center the parcel in a stable position. In contrast, the convex shape of the tilting tray 250 causes the parcels 114 to be in a destabilized state on the idler rollers 254, and the parcel 114 is prevented from falling off the tray by the retainers 274, 276, 277.

Upon commanding operation of the input conveyor, the controller also changes the status of the particular tray to "full" in memory and associates the next zip code in the sequential list with the particular tray (Block 7). If desired, a photocell or other sensor can be placed between the input conveyor and the carriages to determine whether in fact a parcel has been delivered to the tray upon operation of the input conveyor. As the now-loaded carriage continues to move, its passage is detected by the photocell 118, which is located just downstream of the input conveyor, as noted in Block 8 of the flow chart. The photocell provides a signal corresponding to the encoder count at the time the carriage passes to the controller, where the count is stored. At Block 9, the previously calculated number of pulses between the photocell and the destination output chum are added to the current encoder count to provide the count that will be reached when it is necessary to unload the parcel. This value is stored in association with the particular tray.

In order to account for any drifting of the carriages as they travel around the monorail 12, one or more additional photocell detectors 121 may be provided along the monorail path. At Block 10, the output signal from an additional photocell is checked to determine whether the carriage in question passes the additional photocell at precisely the encoder count corresponding to the position at which the carriage should be found. If there is a variation from the predicted count, the stored unload count associated with the carriage is updated to reflect the change. If the lack of correspondence is greater than a predetermined threshold, the carriage may be rerouted to an unsorted output chute for resorting.

At Block 11, the controller, upon receiving the unload count from the shaft encoder, sends a signal to operate the tilting mechanism 22 or 280 associated with the output chute assigned the destination zip code. Tilting begins shortly before complete alignment of the tray 60, 90, or 250 with the output chute 140 or 141, so that movement is imparted to the parcel 114 at the proper time for the parcel to slide off the tray onto the output chute. Any number of trays can be tilted simultaneously depending on when they reach the location of the unload count. At this time, as noted in Block 12, the memory record associated with the tray may be cleared of values associated with the sorted parcel and the tray status changed to "empty."

As noted above, the trays 60, 90 remain tilted until the trays pass through the tray return mechanisms 24, which returns the trays to their horizontal position without intervention by the controller. The process outlined in FIG. 21 is repeated when the tray returns to the input section 18. In contrast, the springs 262, 264 attached to the tray 250 immediately return the tray 250 to a horizontal orientation after tilting of the tray occurs.

It is possible to operate the system with multiple input conveyors, with each of the input conveyors having a photocell detector 118 associated with it to signal the location of a carriage that has just received a parcel from the input conveyor. This permits the unload count for the carriage to be determined. It would be possible to alter the programmed logic to cause input conveyors positioned upstream of other input conveyors to skip empty carriages in a coordinated fashion to allow all of the input conveyors to continue loading their parcels. Of course, upper and lower input conveyors 113 and 112 can operate virtually simultaneously.

From the foregoing description, it will be seen that an automatic sorting system embodying the present invention provides a high throughput of parcels to be sorted, using a system that is simple in construction, is easy to maintain and keep on line, and occupies a relatively small amount of space. The system also operates at low noise levels. In particular, the efficiency of the system is improved by the use of a multi-level tray system associated with carriages running along one track. The novel drive mechanism moves the carriages in a reliable manner without the need for complex belt or chain drives. Furthermore, the carriages may optionally be linked by the low-noise, pliable linkage assembly described above. An optional embodiment of the present invention allows for pressured engagement of the carriage to the monorail. A tilting tray is also provided which offers high speed sorting by presenting a package in a destabilized position so that a parcel may be discharged with very little tilt.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. An apparatus for transporting objects, comprising:
   a track; and
   a carriage for moving along the track and transporting the objects, the carriage comprising:
   a frame;
   a first bearing assembly linked to the frame and for engaging a first side of the track;
   a second movable bearing assembly positioned between the frame and a second side of the track;
   a slack control device positioned to bias the second bearing assembly against the track; and
   a cam defining a camming surface, the cam operatively associated with the slack control device, the camming surface configured to engage a first location on the second bearing assembly, and the cam being biased by the slack control device such that the cam urges the second assembly to engage the track.

2. The apparatus of claim 1, further comprising a second slack control device positioned to bias the first bearing assembly against the track.

3. The apparatus of claim 1, wherein the cam is a cylinder mounted for eccentric rotation, the cam surface is the outer surface of the cylinder, the cam surface defines minimum and maximum camming action for the second bearing assembly, and the slack control device biases the cylinder toward the maximum camming action.

4. The apparatus of claim 3, further comprising a lever arm fixed to rotate with the cylinder, the slack control device operatively associated with the lever arm at a position away from the rotational axis of the cylinder.

5. The apparatus of claim 3, further comprising a second cam defining a second camming surface, the second cam operatively associated with the slack control device, the second camming surface for engaging a second location on the second bearing assembly, and the second cam biased by the slack control device such that the second cam urges the second bearing assembly to engage the track.

6. The apparatus of claim 5, wherein the track is engaged by the second bearing assembly from two positions on the second bearing assembly, the two positions located substantially opposite the first and second locations on the second bearing assembly.

7. The apparatus of claim 5, wherein each of the first and second cams are cylinders mounted for eccentric rotation, each of the cam surfaces are the outer surfaces of the cylinders, each of the cam surfaces defines minimum and maximum camming action for the second bearing assembly, and the slack control device biases each of the cylinders toward the maximum camming action.

8. The apparatus of claim 7, further comprising first and second lever arms, the first lever arm fixed to rotate with the first cylinder, and the second lever arm fixed to rotate with the second cylinder, the slack control device associated with each of the lever arms at positions away from the rotational axes of the first and second cylinders.

9. A carriage for traveling along a track, the carriage comprising:
 a frame;
 a first bearing assembly linked to the frame and capable of a first side of the track;
 a second movable bearing assembly positioned between the frame and a second side of the track;
 a slack control device positioned to bias the second bearing assembly against the track; and
 a cam defining a camming surface, the cam operatively associated with the slack control device, the camming surface configured to engage a first location on the second bearing assembly, and the cam being biased by the slack control device such that the cam urges the second bearing assembly to engage the track.

10. The apparatus of claim 9, wherein the cam is a cylinder mounted for eccentric rotation, the cam surface is the outer circumference of the cylinder, the cam surface defines minimum and maximum camming action for the second bearing assembly, and ⓒ2 the slack control device biases the cylinder toward the maximum camming action.

11. The apparatus of claim 10, further comprising a lever arm fixed to rotate with the cylinder, the slack control device being operatively associated with the lever arm at a position away from the rotational axis of the cylinder.

12. The apparatus of claim 10, further comprising a second cam defining a second camming surface, the second cam operatively associated with the slack control device, the second camming surface capable of engaging a second location on the second bearing assembly, and the second cam being biased by the slack control device such that the second cam urges the second bearing assembly to engage the track.

13. The apparatus of claim 12, wherein the track is engaged by the second bearing assembly from two positions on the second bearing assembly, the two positions located substantially opposite the first and second locations on the second bearing assembly.

14. The apparatus of claim 12, wherein each of the first and second cams are cylinders mounted for eccentric rotation, each of the cam surfaces are the outer circumference of the cylinders, each of the cam surfaces defines minimum and maximum camming action for the second bearing assembly, and the slack control device biases each of the cylinders into the maximum camming action.

15. The apparatus of claim 14, further comprising first and second lever arms, the first lever arm fixed to rotate with the first cylinder, and the second lever arm fixed to rotate with the second cylinder, the slack control device associated with each of the lever arms at positions away from the rotational axes of the first and second cylinders.

16. An apparatus for transporting objects, comprising:
 a track;
 a carriage for moving along the track and transporting the objects, the carriage comprising:
 a frame;
 a first bearing assembly linked to the frame and for engaging a first side of the track;
 a second bearing assembly slidably mounted to the frame; and
 a cam surface selectively positionable against a location on the second bearing assembly and operative to adjust the distance between the first bearing assembly and the second bearing assembly such that the second bearing assembly may engage the track.

17. The apparatus of claim 16, further comprising a second cam surface selectively positionable against a second location on the second bearing assembly.

18. The apparatus of claim 17, wherein the track is engaged by the second bearing assembly from two positions on the second bearing assembly, the two positions located substantially opposite the first and second locations on the second bearing assembly.

19. An apparatus for transporting objects, comprising:
 a track; and
 a carriage for moving along the track and transporting the objects, the carriage comprising:
 a frame;
 a first movable bearing assembly linked to the frame and for engaging a first side of the track;
 a second movable bearing assembly positioned between the frame and a second side of the track;
 a first slack control device positioned to bias the first bearing assembly against the track; and
 a second slack control device positioned to bias the second bearing assembly against the track independent of the biasing of the first slack control device.

20. The apparatus of claim 19, wherein the track defines a top, a bottom, and two sides away from the top and bottom, and which the first and second movable bearing assemblies are configured to engage the two sides.

* * * * *